(12) United States Patent
Morita et al.

(10) Patent No.: US 7,669,126 B2
(45) Date of Patent: Feb. 23, 2010

(54) PLAYBACK DEVICE, AND METHOD OF DISPLAYING MANIPULATION MENU IN PLAYBACK DEVICE

(75) Inventors: Toru Morita, Tokyo (JP); Shuji Hiramatsu, Tokyo (JP); Shigeru Enomoto, Kanagawa (JP); Edgar Allan Tu, Castro Valley, CA (US)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 620 days.

(21) Appl. No.: 10/930,373

(22) Filed: Aug. 31, 2004

(65) Prior Publication Data

US 2005/0235209 A1 Oct. 20, 2005

(30) Foreign Application Priority Data

Sep. 1, 2003 (JP) ............................. 2003-308934

(51) Int. Cl.
*G06F 3/00* (2006.01)
*G06F 3/048* (2006.01)
*G09F 5/00* (2006.01)

(52) U.S. Cl. ...................... 715/716; 715/719; 715/723; 715/783; 715/810; 715/835; 345/156

(58) Field of Classification Search .................. 348/46, 348/95; 345/156; 386/46, 125, 109, 111; 715/716, 719–721, 723, 764, 781, 783, 784, 715/786, 787, 790, 802, 810, 817, 818, 821, 715/823, 825, 828, 830, 835, 836, 838, 839, 715/841, 864

See application file for complete search history.

(56) References Cited

U.S. PATENT DOCUMENTS 5,745,109 A * 4/1998 Nakano et al. .............. 715/838

(Continued)

FOREIGN PATENT DOCUMENTS

JP 6-214978 8/1994

(Continued)

OTHER PUBLICATIONS

Xbox Media Player, Dec. 1, 2002, http://web.archive.org/web/20021201231113/http://www.xboxmediaplayer.de/newweb/info_screens.htm.*

(Continued)

*Primary Examiner*—Kieu Vu
*Assistant Examiner*—Yongjia Pan
(74) *Attorney, Agent, or Firm*—Frommer Lawrence & Haug LLP; William S. Frommer; Ellen Marcie Emas

(57) ABSTRACT

A plurality of identification miniature images for to-be-replayed objects is displayed simultaneously on a manipulating-function menu screen with taking one of the to-be-replayed objects corresponding to one of the identification miniature images in a predetermined position as a to-be-replayed object of interest. There are displayed a first group of a plurality of manipulating-function items for the respective to-be-replayed objects and a second group of a plurality of manipulating-function items related to a plurality of to-be-replayed objects. While any one of the manipulating-function items included in the first group is being selected, the identification miniature image corresponding to the to-be-replayed object of interest is displayed for differentiation from the other identification miniature images.

38 Claims, 13 Drawing Sheets

U.S. PATENT DOCUMENTS

| | | | |
|---|---|---|---|
| 6,262,722 B1* | 7/2001 | Allison et al. | 725/39 |
| 6,266,098 B1* | 7/2001 | Cove et al. | 348/563 |
| 6,292,188 B1* | 9/2001 | Carlson et al. | 715/854 |
| 6,295,062 B1* | 9/2001 | Tada et al. | 715/835 |
| 6,538,672 B1* | 3/2003 | Dobbelaar | 715/810 |
| 6,544,123 B1* | 4/2003 | Tanaka et al. | 463/36 |
| 6,678,891 B1* | 1/2004 | Wilcox et al. | 725/42 |
| 6,690,391 B1* | 2/2004 | Proehl et al. | 715/720 |
| 6,842,653 B2* | 1/2005 | Weishut et al. | 700/83 |
| 6,910,191 B2* | 6/2005 | Segerberg et al. | 715/830 |
| 6,966,037 B2* | 11/2005 | Fredriksson et al. | 715/830 |
| 6,976,228 B2* | 12/2005 | Bernhardson | 715/830 |
| 7,051,291 B2* | 5/2006 | Sciammarella et al. | 715/838 |
| 7,107,531 B2* | 9/2006 | Billmaier et al. | 715/720 |
| 7,178,111 B2* | 2/2007 | Glein et al. | 715/848 |
| 2003/0001907 A1* | 1/2003 | Bergsten et al. | 345/853 |
| 2003/0169302 A1* | 9/2003 | Davidsson et al. | 345/810 |
| 2004/0008229 A1* | 1/2004 | Hultcrantz | 345/810 |
| 2004/0233238 A1* | 11/2004 | Lahdesmaki | 345/810 |
| 2005/0076307 A1* | 4/2005 | Robbin | 715/792 |

FOREIGN PATENT DOCUMENTS

| | | | |
|---|---|---|---|
| JP | 9-204286 | | 8/1997 |
| JP | 10-293676 | | 11/1998 |
| JP | 11-66083 | | 3/1999 |
| JP | 2000 146619 | | 5/2000 |
| JP | 2002-14989 | | 1/2002 |
| JP | 02002044218 A | * | 2/2002 |
| JP | 2002-543487 | | 12/2002 |
| JP | 2003-233626 | | 8/2003 |
| WO | WO 00/05718 | | 2/2000 |
| WO | WO 00/65429 | * | 11/2000 |
| WO | WO 01/41144 | | 6/2001 |
| WO | WO 03/052638 | | 6/2003 |

OTHER PUBLICATIONS

Mills M et al, Association for Computing Machinery, "A Magnifier Tool for Video Data" May 3, 1992, Striking a Balance. Monterey, May 3-7, 1992, Proceedings of the Conference on Human Factors in Computing Systems, Reading, Addison Wesley, US, pp. 93-98, XP000426811.

* cited by examiner

OPTION

PLAYBACK DEVICE, AND METHOD OF DISPLAYING MANIPULATION MENU IN PLAYBACK DEVICE

BACKGROUND OF THE INVENTION

1. Field of the Invention

The present invention relates to a user interface technique adopted in a player, suitably applicable to reading of a content from a hard disk, DVD (digital versatile disk) and CD (compact disk), for example.

This application claims the priority of the Japanese Patent Application No. 2003-308934 filed on Sep. 1, 2003, the entirety of which is incorporated by reference herein.

Note in the following description, the "content" means information the human can recognize visually and aurally, such as audio data such as music, images such as moving and still pictures, text data such as electronic novels, game programs or the like.

Also, the "medium" means an information storage medium such as a hard disk, optical disk, memory card, magnetic tape or the like, and an information transmission medium such as wave, cable or the like. It should be noted however that a storage medium such as a game program medium or a transmission medium, of which the data format and compression format are different from the "medium", is differentiated from the "medium".

2. Description of the Related Art

A video or music content is provided in the form of data stored in a medium to the user. The medium has become greatly diversified, and the content has also become diversified. Various types and large volume of content are available. Also, a so-called multimedia player has been proposed which can replay contents from such various types of media (cf. Japanese Published Unexamined Patent Application No. 73428 of 1999).

For such types of players, a user interface is demanded by which the user can rapidly retrieve a desired content for replay and can edit and delete the content easily.

In management of applications, folders or files in a personal computer, for example, a miniature image for identification of each of the applications, folders or files is used as an icon formed from a figure or letter, which will permit quick understanding of the contents of them, in order to simplify the user interface.

For processing the application, folder or file corresponding to each icon, the mouse cursor is placed on the icon and the left button of the mouse is clicked to display a pull-down menu, and a corresponding process is selected from the menu. Also, for changing the arrayed order of a plurality of icons, the mouse cursor is placed on other than the icons and the right button of the mouse is clicked to display a pull-down menu, and a corresponding process is selected from the menu.

Thus application of the above technique of the personal computer to a content player is conceivable.

However, many of the content players have only a small display which displays a time-keeping, broadcast channel, type of a medium being loaded, etc. Such a small display of the player cannot be used similarly to the personal computer's display.

On this account, it is conceivable to use the screen of a monitor receiver for displaying a reproduced video output from a content player as a user interface display of the content player.

However, the screen of the monitor receiver for displaying a reproduced video output from the content player will be viewed from a plurality of directions (viewers) at the same time. Namely, different from the personal computer's display screen, which is placed in front of the user of the personal computer, the monitor receiver screen is viewed at a distance from the screen. Therefore, indication of small letters on an icon, movement of the pointer, etc. as on the personal computer's display screen is not suitable for use on the monitor receiver screen.

Also, not few users of the content player are well familiar with normal image manipulations made with the display of the personal computer. For such users of the content player, the above-mentioned user interface of the personal computer will not be convenient if it is applied as it is to the content player.

OBJECT AND SUMMARY OF THE INVENTION

It is therefore an object of the present invention to overcome the above-mentioned drawbacks of the related art by providing a user interface having an improved operability and visibility and which permits easier selection of individual to-be-replayed objects such as contents, media, etc. and manipulating-function items for all the to-be-replayed objects.

The above object can be attained by providing a playback device according to this invention, including:

a command input unit to accept a manipulation command entered by the user;

a display controller to generate image data on a manipulating-function menu screen including a plurality of identification miniature images for respective ones of a plurality of to-be-replayed objects; and a display output unit to output the manipulating-function menu screen image data from the display controller to a display unit, the display controller functioning to:

display the plurality of identification miniature images for respective ones of the plurality of to-be-replayed objects simultaneously on one display screen with taking one of the to-be-replayed objects corresponding to one of the identification miniature images in a predetermined position as a to-be-replayed object of interest, while displaying a first group of a plurality of manipulating-function items for each of the to-be-replayed objects and a second group of a plurality of manipulating-function items for each of the plurality of to-be-replayed objects so that one of the manipulating-function items can be selected by an operation made via the command input unit, with an indication of which one of the manipulating-function items is being selected; and display, during selection of any one of the manipulating-function items included in the first group, the identification miniature image corresponding to the to-be-replayed object of interest in such a manner that the identification miniature image can be differentiated from the other identification miniature images.

In the above playback device according to this invention, the plurality of identification miniature images for the respective to-be-replayed objects (contents, for example) is displayed simultaneously on the display screen with a to-be-replayed object corresponding to an identification miniature image in a predetermined position, for example, a central identification miniature image, being taken as a to-be-replayed object of interest, and there are displayed the first group of the plurality of manipulating-function items for each of to-be-replayed objects and the second group of the plurality of manipulating-function items for the plurality of to-be-replayed objects.

The first and second groups of manipulating-function items are displayed for one of them to be selectable by an operation made via the command input unit, with an indication of which one of the manipulating-function items is being selected, and there is displayed, during selection of any one of the manipulating-function items included in the first group, the identification miniature image corresponding to the to-be-replayed object of interest in such a manner that the identification miniature image can be differentiated from the other identification miniature images.

As above, according to this invention, while a manipulating-function item such as replay, delete or the like is being selected for one of interest of the plurality of to-be-replayed objects displayed as the plurality of identification miniature images, an identification miniature image corresponding to the to-be-replayed object of interest is displayed in a larger size, for example, for differentiation from the other identification miniature images. Therefore, the user can readily know that the manipulating-function item being selected is directed to the to-be-replayed object of interest.

Also, in the playback device according to this invention, the display controller may be adapted to display the first and second groups of manipulating-function items when a predetermined manipulation command is accepted via the command input unit while the plurality of identification miniature images for the respective to-be-replayed objects is being displayed on one display screen with a to-be-replayed object corresponding to a identification miniature image in a predetermined position being taken as a to-be-replayed object of interest.

According to this invention, the manipulating-function items for the to-be-replayed objects and those for the plurality of identification miniature images can easily be displayed by making a predetermined operation while the plurality of identification miniature images for respective to-be-replayed objects is being displayed.

In the above playback device, when the predetermined manipulation command is entered via the command input unit, the plurality of identification miniature images for the respective to-be-replayed objects is moved to a one-sided position on the display screen, and the first and second groups of manipulating-function items are displayed in a space resulted from the movement of the identification miniature images.

According to this invention, when the predetermined manipulation command is entered via the command input unit, the plurality of identification miniature images is moved to one-sided position, namely, left, right, top or bottom, on the display screen, and the first and second groups of manipulating-function items are displayed in the space resulted from the movement of the identification miniature images.

Also, in the playback device, when a first one of the groups of identification miniature images is moved to a one-sided position on the display screen, the identification miniature image of the to-be-replayed object of interest is displayed with an indication of the movement of the identification miniature images corresponding to the to-be-replayed object of interest.

According to this invention, the user can readily know when the plurality of identification miniature images has been moved and where the identification miniature image corresponding to the to-be-replayed object of interest has been moved.

In the playback device, either of the first and second groups of manipulating-function items, whichever includes the manipulating-function item being selected, is displayed being emphasized for differentiation from the other group.

According to this invention, the group of manipulating-function items one of which is being selected is displayed being emphasized in such a manner that the user can know at a glance that group.

In the playback device, a plurality of types of media can be replayed, a plurality of contents in each of the media can be replayed, and the to-be-replayed object is the content that can be replayed;

the identification miniature images corresponding to the to-be-replayed objects are taken as first identification miniature images while the identification miniature images corresponding to the respective ones of the plurality of types of media are taken as second identification miniature images;

the display controller functions to:

display a menu in which the plurality of first identification miniature images is arrayed in a first direction on the display screen while the plurality of second identification miniature images is arrayed in a second direction intersecting the first direction, and a content corresponding to one of the first identification miniature images positioned near the intersection between the first- and second-directional arrays is taken as a content in the to-be-replayed object of interest; and display, in the display screen displaying the menu having displayed thereon the first- and second-directional arrays intersecting each other, the manipulating-function menu screen including the first-directional array of the plurality of first identification miniature images with deletion of the second-directional array of the plurality of second identification miniature images, when a predetermined operation is made via the command input unit.

According the invention, there can be provided a user interface having the effect of the invention as a playback device capable of replaying multiple contents in media of many different types. In the invention, since a to-be-replayed object of interest, that is, a content of interest, is taken as a to-be-replayed object in a predetermined position near the intersection between the second identification miniature images corresponding to media, respectively, and the first identification miniature images corresponding to contents, respectively, the user can know at a glance which the content of interest is.

In the playback device, at least the first identification miniature images arrayed in the first direction is scrolled in the first direction by a predetermined operation made via the command input unit to allow the content in the to-be-replayed object of interest at the intersection to be changed.

Even if the contents are too many to be displayed on the display screen, each of them can be selected as a content of interest by scrolling. It should be noted that the second identification miniature images for the respective media can also be scrolled. In this case, there is available to the multimedia player an effective manipulating-function menu (user interface) for manipulation of many contents in one of many types of medium.

Also, the above object can be attained by providing a playback device according to this invention, including:

a command input unit to accept a command entered by the user;

a display controller to generate image data on a manipulating-function menu screen including a plurality of identification miniature images for respective ones of a plurality of to-be-replayed objects; and a display output unit to output the manipulating-function menu screen image data from the display controller to a display unit, the display controller functioning to:

selectively display, by a predetermined operated made via the command input unit, a first manipulating-function menu screen in which a plurality of identification miniature images for respective ones of the plurality of to-be-replayed objects is displayed simultaneously on one display screen with a to-be-replayed objects corresponding to a identification miniature image in a predetermined position being taken as a to-be-replayed object of interest and also a first group of a plurality of manipulating-function items for each of the to-be-replayed objects is displayed so that one of the manipulating-function items can be selected by an operation made via the command input unit, and with an indication of which one of the manipulating-function items is being selected, and a second manipulating-function menu screen in which the plurality of identification miniature images for respective ones of the plurality of to-be-replayed objects is displayed simultaneously on one display screen with a to-be-replayed objects corresponding to the identification miniature image in a predetermined position being taken as a to-be-replayed object of interest and also a second group of a plurality of manipulating-function items for the plurality of to-be-replayed objects is displayed so that one of the manipulating-function items can be selected by an operation made the command input unit, and with an indication of which one of the manipulating-function items is being selected; and display, during selection any one of the manipulating-function items included in at least the first group, the identification miniature image corresponding to the to-be-replayed object of interest in such a manner that the identification miniature image can be differentiated from the other identification miniature images.

According to this invention, there are selectively displayed by a predetermined operation made via the command input unit the first manipulating-function menu screen in which there are displayed the plurality of identification miniature images and the first group of manipulating-function items including the plurality of manipulating-function items for each of the to-be-replayed objects and the second manipulating-function menu screen in which there are displayed the plurality of identification miniature images and the second group of manipulating-function items including the plurality of manipulating-function items for the plurality of to-be-replayed objects.

The plurality of identification miniature images and the first and second groups of manipulating-function items are not displayed simultaneously, and thus the user can make a ready discrimination between selection of one of the manipulating-function items for each of the to-be-replayed objects and that of the manipulating-function items for the plurality of to-be-replayed objects.

In addition, since in the first manipulating-function menu screen in which one of the manipulating-function items is being selected for each of the to-be-replayed objects, an identification miniature image corresponding to a to-be-replayed object of interest is displayed for differentiation from other identification miniature images, so the user can easily know when one of the manipulating-function items is being selected for each of the to-be-replayed objects and also for which one of the to-be-replayed objects one of the manipulating-function items is being selected.

According to the present invention, there is provided a user interface having an improved operability and visibility and which permits easier selection of individual to-be-replayed objects such as contents, media, etc. and manipulating-function items for all the to-be-replayed objects.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning a player and method of displaying a user interface display, adopted in the player, as embodiments thereof with reference to the accompanying drawings.

The embodiment of the present invention, which will be illustrated and described below, is applied to a player that replays a plurality of contents from multiple types of media such as a broadcasting, recording media like optical disks, video game machine, etc. (will be referred to as "multimedia player" hereunder). In the following description of the embodiment of the present invention, the "to-be-replayed object" means a content.

In case a personal computer is used to replay a plurality of contents from a plurality of media, for example, it uses an individual program like a "viewer" dedicated for each of the contents. Such an individual program is prepared by each of different venders. Normally, no common user interface is available for the individual programs, and thus the methods of operating the user interfaces are different from each other. Even if the user interfaces for the programs are unified into a common user interface like the so-called portal screen, the common user interface is only an aggregation of the different user interfaces. Also, it takes a considerable length of time to start up each of the programs, which will provide no swift shift from one to another of the programs.

On the contrary, the embodiment of the present invention has a common user interface integrally including functions of reproducing, deleting or otherwise manipulating each of a plurality of contents from multiple types of media and user interfaces for manipulating all the plurality of contents to assure a common operability of the user interface.

Also, the embodiment permits a quick, real-time shift from one to another of the plurality of media without any operation delay due to the shift between the media. Further, the present invention provides a user interface easily operable intuitively by the user to assure an improved convenience for the user.

<Construction of Multimedia Playback System>

Figure 1:
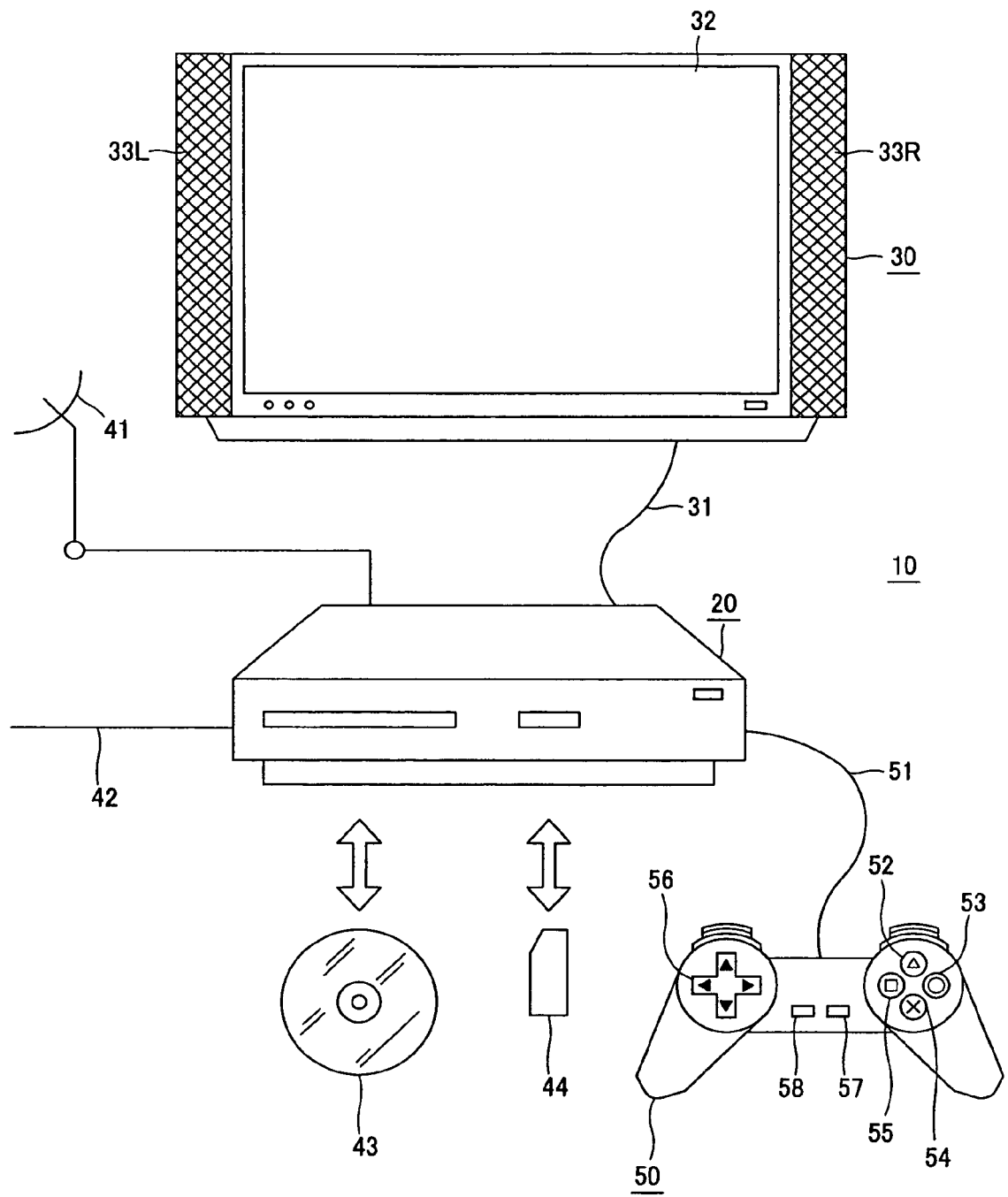
FIG. 1 schematically illustrates a constructional example of the multimedia playback system including the player as an embodiment of the present invention.

Referring now to FIG. 1, there is schematically illustrated the basic construction of a multimedia playback system as the embodiment of the present invention. As shown, the multimedia playback system, generally indicated with a reference 10, includes a multimedia player 20 as the embodiment of the present invention.

According to this embodiment, the multimedia player 20 does not includes any display on which an image and graphical user interface screen are displayed but includes a video output terminal (not shown) instead. The video output terminal of the multimedia player 20 is connected to a monitor display 30 which is a CRT (cathode-ray tube) or LCD (liquid crystal display), for example, by a video output terminal connecting cable 31 of the multimedia player 20, and the monitor display 30 has a screen 32 which displays an image and graphical user interface screen.

Note that in the embodiment in FIG. 1, the monitor display 30 has speakers 33L and 33R provided at the opposite ends thereof and which are supplied with an audio signal from an audio output terminal (not shown) of the multimedia player 20 via a cable (not shown) and reproduce the audio signal acoustically.

The multimedia player 20 is supplied with content information via various types of media such as broadcasting, Internet, optical disk such as DVD (digital versatile disk), CD (compact disk) or the like, memory card, etc.

The broadcasting medium will be described below. In this embodiment, a TV broadcast reception antenna 41 is connected to the multimedia player 20 which will thus be supplied with a TV broadcast signal received by the reception antenna 41. Then, in the multimedia player 20, a broadcast program content selected by the user is extracted from the TV broadcast signal, decoded, and a broadcast program image thus formed is displayed on the screen of the monitor display 30 while a sound of the broadcast program is acoustically reproduced by the speakers 33L and 33R of the monitor display 30. Also, the multimedia player 20 has also a function to record the broadcast program content.

Next, the Internet medium will be described. The multimedia player 20 has connected thereto a communication (telephone) line 42 which connects the multimedia player 20 to the Internet, and web content data acquired via the Internet is supplied to the multimedia player 20. The web content data can be stored in the multimedia player 20 and also utilized with various functions such as a game program function provided in the multimedia player 20.

Further, the optical disk medium will be described. The multimedia player 20 has a function to read data in a content stored in an optical disk 43 such as DVD, CD or the like, decodes the data thus read and supplies the data to the monitor display 30 on which the data is displayed as an image and from which it is provided as a sound. The optical disk can store contents including, for example, images, music and sound in a movie, music sounds such as classical music, popular songs and the like, electronic novel, etc. Data in an electronic novel as a content include text data, audio data for recitation, image data such as book illustrations, etc.

The memory card will be described. The multimedia player 20 has a function to read, and a function to write, data stored in a memory card 44. The memory card 44 can store content data including a captured image such as a moving picture or still picture captured by a digital camera, sound information incidental to the captured image, etc.

In this embodiment, the multimedia player 20 has a video game function. The multimedia player 20 has connected thereto by an interconnecting cable 51 a command input unit (will be referred to as "remote commander" hereunder) 50 as a video game controller. According to this embodiment, since the remote commander 50 is intended primarily for use as the video game controller, so it has a relatively small number of control buttons. In the embodiment shown in FIG. 1, the remote commander 50 has four control buttons 52, 53, 54 and 55 provided at the respective apexes of an imaginary rhombus, cross-shaped button 56 having directional arrows, start button 57, and a select button 58.

The four control buttons 52, 53, 54 and 55 have provided on their tops, respectively, by printing or the like, special markings like small circle, triangle, square and cross in this embodiment as shown in FIG. 1. As will further be described later, four control buttons 52, 53, 54 and 55, start button 57 and select button 58 are pre-correlated with predetermined control items in a graphical user interface displayed on the screen of the monitor display 30. Also, as will further be described, since the same markings as those provided on the tops of the control buttons 52, 53, 54 and 55 are added to the respective control items on the user interface on the display screen, so the user will know the correspondence between the control buttons and control items at a glance.

When the user operates one of the control buttons on the remote commander 50 while the user interface is being displayed on the screen of the monitor display 30, the user interface screen will reflect the operation of that control button. The remote commander 50 is designed as a part of the multimedia player 20.

<Construction of Multimedia Player 20 (Functional Block Diagram)>

Figure 2:
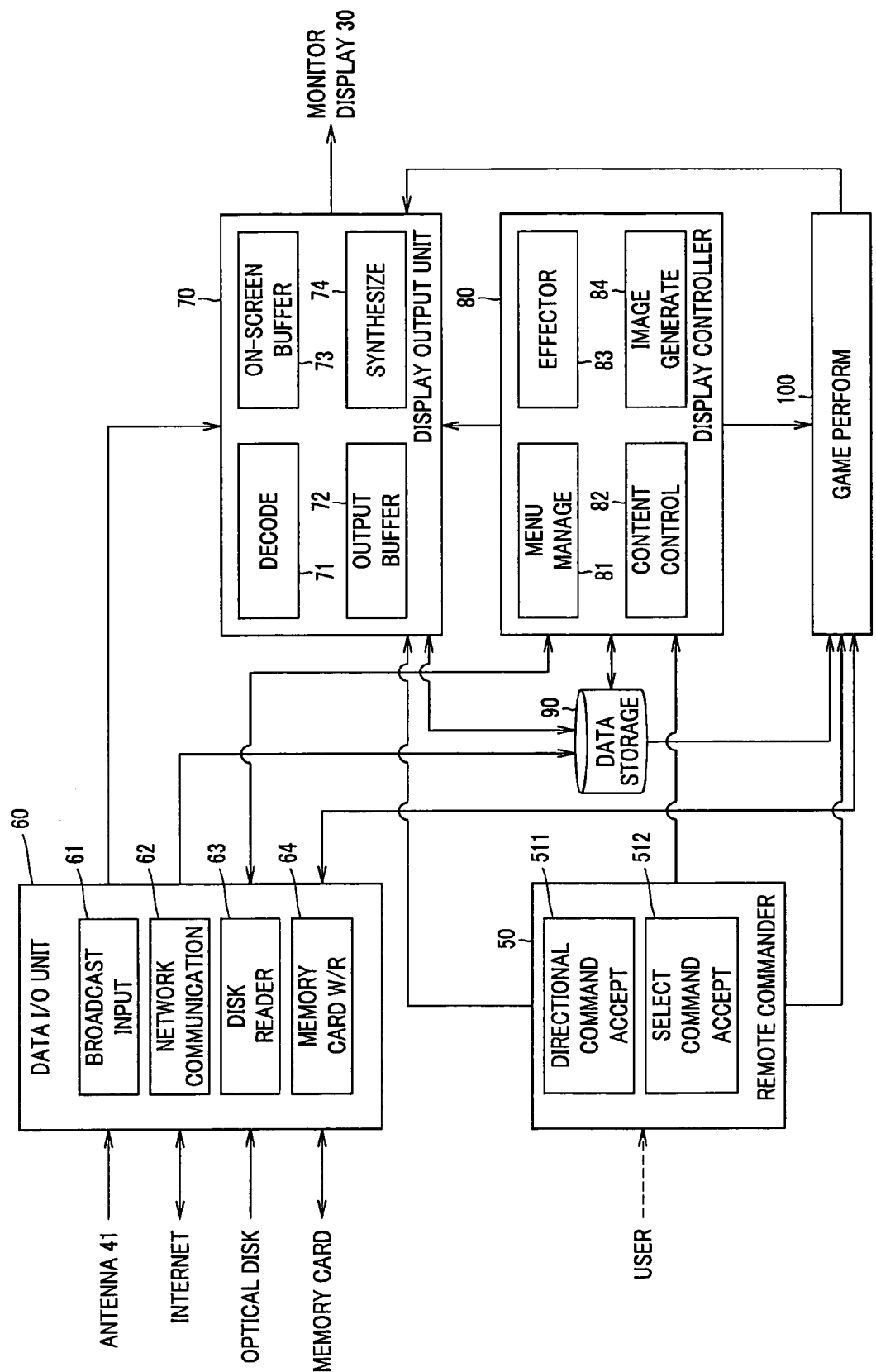
FIG. 2 is a schematic block diagram of a substantial part of the player as the embodiment of the present invention.

FIG. 2 shows a functional block diagram of the major part of the multimedia player 20 as a player according to the embodiment of the present invention.

As shown in FIG. 2, the multimedia player 20 according to this embodiment includes the remote commander 50, data input/output unit 60, display output unit 70, display controller 80, storage unit 90 and a game performer 100.

The multimedia player 20 includes a microprocessor (CPU (=central processing unit)), hard disk drive, memory, multi-disk drive for optical disks such as DVD, CD, etc., memory card drive, drawing circuit for a video game as hardware, and also programs for functions such as data input, data holding, image manipulation, drawing, etc. as software. FIG. 2 shows functional blocks implemented by the above hardware and software in conjunction with each other. Therefore, functions equivalent to the functional blocks in FIG. 2 can be represented in various forms by a combination of the hardware and software.

The remote commander 50 includes a directional command accepting unit 511 which accepts a directional command for upward, downward, leftward and rightward move, entered by operating the user's cross-shaped directional button 56, and a select command accepting unit 512 which accepts a command for content replay, replay stop, menu screen call, etc., entered by operating the other control buttons on the remote commander 50.

Each of the directional command accepting unit 511 and select command accepting unit 512 is a combination of a circuit to detect an operation of each of the plurality of buttons and a program to recognize an operated button.

In this embodiment, the directional command accepting unit 511 includes the cross-shaped directional button 56. The cross-shaped directional button 56 may be replaced with a joystick. In the directional command accepting unit 511, an oblique direction may be recognized in a digital manner (with a binary value) or analog manner (with a plurality of ternary or greater values). In this embodiment, however, when a command for oblique direction is given by the user operating the remote commander 50 in any of the recognition manners, the command for oblique direction is regarded as either a command for vertical direction or a command for horizontal direction. In this embodiment, priority is given to the command for horizontal direction, for example, and the command for oblique direction is taken as a command for vertical direction.

Of the buttons provided as the select command accepting unit 512, one correlated with a call for the menu screen is the start button 57 in this embodiment. The start button 57 is of a toggle type. Namely, each time the start button 57 is pressed, the medium selection and content selection screens on the user interface screen, which will be described in detail later, are alternately turned on and off.

Button-operation information accepted by the directional command accepting unit 511 and select command accepting unit 512 of the remote commander 50 is sent to the display output unit 70, display controller 80 and game performer 100.

As shown, the data input/output unit 60 includes a broadcast input unit 61, network communication unit 62, disk read head 63, and a memory card read/writ head 64.

The broadcast input unit 61 is a functional block by which the multimedia player 20 acquires broadcast program content data on a selected channel from TV broadcast signals received by the antenna 41. The network communication unit 62 is a functional block by which the multimedia player 20 downloads data such as web content via the Internet and uploads predetermined information via the Internet in a network video game.

The disk read head 63 reads content data from the optical disk 43 such as DVD or CD and supplies the data to the multimedia player 20. The memory card read/write head 64 is a functional block by which the multimedia player 20 reads data from, or writes data to, the memory card 44.

The data supplied to the multimedia player 20 via each of the blocks 61 to 64 included in the data input/output unit 60 is sent to the display output unit 70, display controller 80, storage unit 90 and game performer 100.

The storage unit 90 includes a hard disk drive and a software for reading and writing content data, for example. It stores broadcast program content data supplied from the broadcast input unit 61 of the data input/output unit 60, web content data supplied via the network communication unit 62, content such as music, movie or the like read from the optical disk 43, content such as still image, moving picture or the like read from the memory card read/write head 64.

The storage unit 90 also stores image data on identification miniature images for respective ones of a plurality of media which can be replayed by the multimedia player 20 (will be referred to as "medium icon" hereunder) and image data on identification miniature images for respective ones of a plurality of contents which indicate what the contents are (will be referred to as "content icon" hereunder).

In this embodiment, since the plurality of media that can be replayed by the multimedia player 20 are specific ones, the medium icons use a identification miniature image such as letters, figure or symbol for each medium.

The content icon uses a small image or a so-called thumbnail of a video content. A moving-picture content uses a small image of a typical frame, while a still image content uses its small image.

For music content, a content icon is formed from letters of a title, genre and artist's name as data incidental to a CD, web content or broadcast content, symbol or figure. The music content icon may automatically be prepared from information incidental to the content or may be prepared by the user himself or herself. The medium and content icons are used as identification miniature images for media and contents on the menu screen as a user interface screen.

In FIG. 2, the generation unit for such medium and content icons is omitted for the simplicity of the illustration and explanation.

The display output unit 70 includes a decoder 71, output buffer 72, on-screen buffer 73 and synthesizer 74.

The decoder 71 decodes, in response to a command entered by the user operating the remote commander 50, coded broadcast content data supplied from the data input/output unit 60 or storage unit 90 or coded reproduced data such as movie, music or the like from a DVD or CD, and stores the decoded image data, music data, etc. into the output buffer 72.

The output buffer 72 is provided to provisionally store recorded image data or music data to be supplied to the monitor display 30 before the supply to the latter.

The on-screen buffer 73 stores image data on the user interface screen generated by the display controller 80, for example, as image data for on-screen display. The on-screen buffer 73 is provided to provisionally store image data for on-screen display such as the user interface screen image information etc. before supply to the monitor display 30.

The synthesizer 74 combines reproduced image data from the output buffer 72 and user interface screen image data from the on-screen buffer 73, converts the combined data into analog signal, and supplies the converted data to the monitor display 30.

The display controller 80 includes a menu manager 81, content controller 82, effector 83 and image generator 84.

The menu manager 81 manages, as menu items, one or more manipulating functions available for each type of media and each medium, one or more manipulating functions for each of contents in a selected medium, and one or more manipulating functions for all contents icons in the selected medium.

Also, the menu manager 81 stores content attribute information indicating what a content stored in the storage unit 90 is and attribute information on a content supplied via the data input/output unit 60, and also the type of a currently selected medium and content attribute information on this medium. The content attribute information includes the title, genre, artist's name of the content (broadcast program, movie, album, etc.), by which the content can be recognized.

Based on a user's command accepted by the remote commander 50 from the user interface screen, the content controller 82 controls the reproduction or replay of a medium to be selected in response to the command, selection of data supply to the data input/output unit 60, data supply from the storage unit 90, data storage to the storage unit 90, and operation of the game performer 100.

Also based on a user's command accepted by the remote commander 50 from the user interface screen, the effector 83 controls movement of a medium icon and content icon displayed in a menu on the user interface screen. More specifically, in this embodiment, the effector 83 controls scrolling through a medium icon array and content icon array, emphasized display of a medium icon and content icon of interest, movement of the content icon array on the user interface screen, rotation of the content icon of interest, etc.

The emphasized display of a medium icon and content icon of interest is to differentiate these icons from other ones by displaying them in a different way from the other icons. For example, the icon of interest is displayed in a different color from that of the other icons and in a larger size than that of the other icons. Also in these cases, a distinction is given to the manner of change in color and also to the manner of enlarging.

The image generator 84 generates an image of the user interface screen. More particularly, the image generator 84 generates an image of the initial menu screen including a horizontal array of medium icons and a vertical array of content icons, as will be described in detail later. The initial menu screen is intended for selection of a medium and content. The two icon arrays intersect each other nearly in the vicinity of the center of the initial menu screen. The image generator 84 cooperates with the effector 83 to emphasize in appearance a medium icon and content icon displayed at the point of intersection and near the intersection, respectively, in order to differentiate these icons from other icons.

Also the image generator 84 cooperates with the effector 83 to generate image data indicating scrolling through, and movement of, the above-mentioned icon arrays, and rotation of a content icon, which are made in response to a user's command accepted by the remote commander 50 from the user interface screen.

The game performer 100 executes a game program read by the disk read head 63 from the optical disk 43 or a game program read from the storage unit 90. The game performer 100 executes the game program according to a user's command accepted by the remote commander 50, and sends image and sound of the game to the display output unit 70.

Example of User Interface

Figure 3:
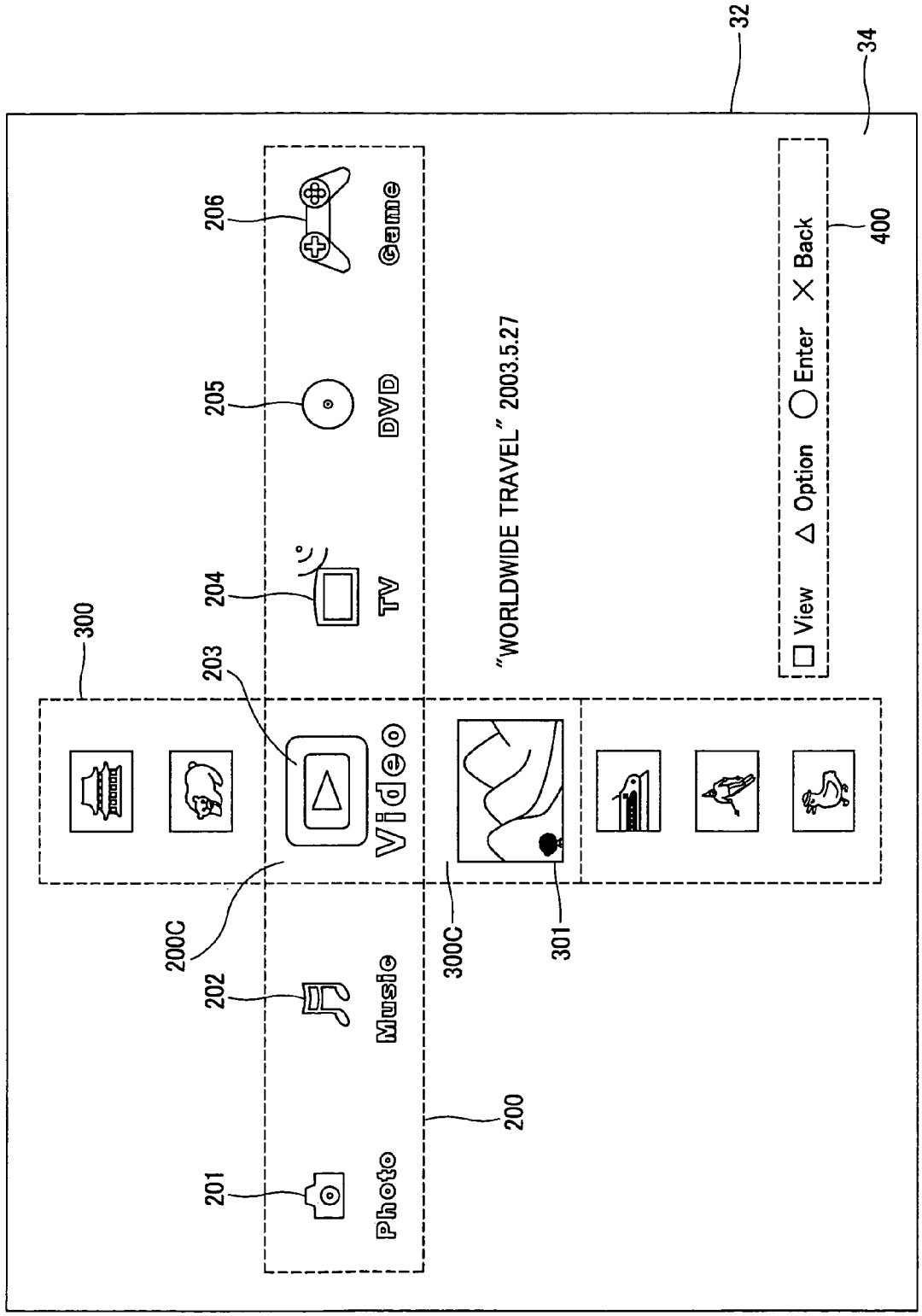
FIG. 3 shows an example of the initial menu screen in the player as the embodiment of the present invention.

FIG. 3 shows an example of the initial menu screen on the user interface screen generated by the multimedia player 20 and displayed on the display screen 32 of the monitor display 30. This example of the initial menu screen appears and disappears on the display screen 32 each time the start button 57, for example, on the remote commander 50.

As shown, the initial menu screen displays a two-dimensional array in which a horizontal medium icon array 200 and vertical content icon array 300 intersect each other nearly in the center of the screen.

Since the medium icons included in the medium icon array 200 are ID small images indicating the types of media that can be replayed by the multimedia player 20, they are predetermined ones. In the example shown in FIG. 3, the medium icons included in the medium icon array 200 include a photo icon 201, music icon 202, moving-picture icon 203, broadcast icon 204, optical disk icon 205 and a game icon 206.

The content icons included in the medium icon array 300 are ID small images of a plurality of contents stored in the storage unit 90 and currently included in a medium (medium of interest) at the intersection of the content icon array 300 with the medium icon array 200. In this example, the content icon array 300 includes six content icons 301 displayed on the screen. As having previously been described, the content icons are thumbnails as miniature images of images, letters or figures.

The user interface screen is an on-screen display. Namely, it is like a translucent screen over an image of a video content displayed on the display screen 32.

The display screen 32 has a background area 34. When a content image being currently replayed is displayed in this background area 34, the effector 83 colors the entire area, defined by a dashed line in FIG. 3, of the medium icon area 200 and content icon area 300 for easier differentiation between these icon areas 200 and 300, or adjust the brightness of the content image. Of course, only the medium icon or content icon may be displayed without coloring or brightness adjustment.

In this example, the medium icon array 200 is not movable vertically. It is displayed still in a position slightly above the vertical center as shown in FIG. 3, for example. However, the entire medium icon array 200 including the plurality of medium icons is movable horizontally according to a user's command for horizontal direction entered by operating the cross-shaped directional button 56 on the remote commander 50.

Also, the content icon array 300 is not movable horizontally. It is displayed still in a position slightly to the left of the horizontal center as shown in FIG. 3, for example. However, the entire content icon array 300 including the plurality of content icons is movable vertically according to a user's command for vertical direction entered by operating the cross-shaped directional button 56 on the remote commander 50.

As above, the plurality of medium icons 201 to 206 is arrayed horizontally as the medium icon array 200. The medium icon array 200 is displayed still against vertical move, and the content icon array 300 in which the plurality of content icons 301 is laid vertically displayed still against horizontal move. So, an area 200C of intersection between the medium and content icon arrays 200 and 300 is stationary in a position obliquely above the center of the display screen 32.

In this example, the content controller 82 recognizes a medium icon displayed in the intersectional area 200C as a medium icon (medium icon of interest) being selected among the plurality of medium icons in the medium icon array 200.

In this example, the effector 83 emphasizes the display of a medium icon in the intersectional area 200C by displaying it in a larger size than that of the other medium icons and in a different color from that of the other medium icons. In the example in FIG. 3, the moving picture icon 203 is displayed in the intersectional area 200C in a different color from that of the other medium icons and in a larger size than that of the other medium icons, as shown, which indicates the moving picture icon 203 is currently selected.

Also in this example, the content controller 82 recognizes a content icon in an area 300C beneath the intersectional area 200C as a content icon (content icon of interest) being currently selected. In this example, the effector 83 displays the content icon of interest in the area 300C in a larger size than that of the other content icons in order to differentiate the content icon of interest from the other content icons.

As above, in this embodiment, an icon displayed in the stationary intersectional area 200C is taken as a medium icon of interest, and an icon displayed in the area 300C (will be referred to as "area of interest" hereunder) beneath the intersectional area 200C is taken as a content icon of interest. Thus, in this embodiment, the user's selection of a medium is such that the medium icon array 200 is scrolled horizontally until a medium icon corresponding to a desired medium appears in the intersectional area 200C, while the user's selection of a content is such that the content icon array 300 is scrolled vertically until a content icon corresponding to a desired content appears in the area of interest 300C.

In response to a user's command for horizontal direction entered by operating the cross-shaped directional button 56 on the remote commander 50, the entire medium icon array 200 is moved horizontally and a medium icon in the intersectional area 200C will have the color and size thereof changed. Therefore, the user can select a medium just by designating the horizontal direction, without having to make any set command like mouse clicking which would be made at the personal computer.

Also at this time, the effector 83 will move the medium icons horizontally by scrolling the entire medium icon array 200 horizontally. In this example, the medium icons included in the medium icon array 200 are displayed moving like a carousel. Thus, so long as the user continuously designates either the leftward or rightward move, all the medium icons can be displayed one after another in the center of the display screen 32.

While each medium icon is being moved horizontally, the effector 83 displays all the medium icons in the same color and size. When the medium icon array 200 is stopped and any of the medium icons is set in the intersectional area 200C, the effector 83 will emphasize the medium icon of interest by displaying it in a different color and size from those of the other medium icons.

Also, the effector 83 may change the color by varying the elements such as brightness, color saturation, chromaticity, etc. of the medium icon of interest or flickering the display of the medium icon of interest. Thus, since a medium icon in the intersectional area 200C is displayed in a different manner from that in which the other medium icons are displayed, the user can easily select his desired medium.

While the medium icons are being moved horizontally but no medium icon is positioned in the intersectional area 200C, the effector 83 will not display the content icon array 300. When any medium icon is set in the intersectional area 200C, the effector 83 will move the content icon array 300 vertically in relation to the intersectional area 200C.

Just scrolling the medium icons horizontally toward the intersectional area 200C, the user can recognize a content belonging to the medium icon displayed in the intersectional area 200C, and also can recognize the medium on the basis of a displayed content. Reversely, when a command for horizontal direction is entered by operating the remote commander 50 while the content icon array 300 is being displayed, the effector 83 will display the content icon array 300 moving toward the intersectional area 200C.

In response to a user's command for vertical direction entered by operating the cross-shaped directional button 56 on the remote commander 50, the entire content icon array 300 is moved vertically and changed in color and size of the content in the area of interest 300C beneath the intersectional area 200C.

The effector 83 moves the content icon vertically by scrolling the entire content icon array 300 vertically. The content icons included in the content icon array 300 are also displayed moving like a carousel. Thus, so long as the user continuously designates either the upward or downward move, all the content icons can be displayed one after another on the display screen 32.

When the user operates the remote commander 50 to make a command for oblique direction, the remote commander 50 will take the command for oblique direction as a command for vertical direction. So, priority is given to the scrolled display of the content icon array 300. Therefore, it is possible to prevent any inadvertent change of medium from one to another, namely, any horizontal scrolling of the medium icon array 200, while the user is scrolling the plurality of content icons.

The effector 83 displays a content icon positioned in the area of interest 300C in a larger size as a content icon of interest. The other content icons will be displayed in a smaller size than that of the content icon of interest. The effector 83 will display a video title and date of recording, for example, as attributes of a content corresponding to the content icon of interest in a position near the content icon of interest, for example, to the right of the content icon of interest, in the example shown in FIG. 3, for example.

The image generator 110 displays the medium icon array 200 in a position somewhat above the vertical center of the display screen 32, and the content icon array 300 a little to the left of the horizontal center of the display screen 32. Thus, a combination of the content icon of interest and attributes of the content is displayed nearly in the center of the display screen 32. The user can view the content icon of interest and attributes of the content in the center of the display screen 32 and thus can easily recognize the contents of them.

While each of the content icons is being quickly moved vertically, the effector 83 displays all the content icons in the same size. When the vertical move is stopped and any of the content icons is set in the area of interest 300C, the effector 83 will increase the size of the content of interest. It should be noted that the effector 83 may change the color by varying the elements such as brightness, color saturation, chromaticity, etc. of the content icon of interest or flickering the display of the content icon of interest.

As above, the multimedia player 20 display an initial menu screen including the medium icon array and content icon array on the display screen 32 of the monitor display 30.

Note here that the photo icon 201 is a medium icon to be selected when an image stored in the storage unit 90 is replayed. The image to be replayed is mainly a still image or moving picture captured using a digital camera. It is read from the memory card 44, for example. The content icon displayed when the photo icon 201 is set in the intersectional area 200C is a thumbnail of a still image or a moving picture. As attributes of the content, photographic information such as date of photo taking, file size, etc. are displayed.

The music icon 202 is a medium icon to be selected when music data stored in the storage unit 90 is replayed. The music data to be replayed is data read from the optical disk 43, for example, and compressed with a specific coding technique. A content icon displayed when the music icon 202 is set in the intersectional area 200C may be displayed for each music piece or each album. As attributes of the content, information such as title, playing time, etc. of the music or album are displayed. The music data may include moving picture data such as a promotion video of a music piece. In this case, the thumbnail of the moving picture may be taken as a content icon.

The moving picture icon 203 is a medium icon to be selected when a captured image stored in the storage unit 90 is replayed. The captured image to be replayed is a moving picture obtained by recording a TV program supplied via the broadcast input unit 61 or moving picture captured using a digital video camera and compressed with a specific coding technique. In this case, thumbnails of frames included in a moving picture are taken as content icons. As attributes, information such as date of photography, playing time, etc. are displayed.

The broadcast icon 204 is a medium icon to be selected when a TV program supplied via the broadcast input unit 61 is replayed. The content icons may be displayed for each, broadcast station or channel. As attributes, information such as a broadcasting station name, broadcast channel, program title, broadcast time, etc. acquired on the basis of data such as EPG (electronic program guide), for example, are displayed. The EPG data is extracted from TV broadcast signals on which it is multiplexed, for example.

The disk icon 205 is a medium icon to be selected when an image or music stored in the optical disk 44 is replayed. When a DVD is recognized as the optical disk 44, letters "DVD" are displayed under the medium icon. When a CD is recognized, letters "CD" are displayed under the medium icon. In case a moving picture is stored in the DVD or CD, a thumbnail thereof is taken as a content icon. If a music piece is stored in the DVD or CD, a mark indicating a music, mark indicating a music number or music genre or the like is taken as a content icon. As attributes, information such as a title, playing time, etc. of the image or music piece is displayed.

The game icon 206 is a medium icon to be selected when a game program is replayed. The game program to be replayed is a game program stored in the storage unit 90 or a game program read from the optical disk 44. In case the game program includes a game icon as data, the game icon is displayed as a content icon. As attributes, information such as a title etc. of the game program is displayed.

As above, the medium icon array 200 and content icon array 300 displayed on the display screen 32 include a line of medium icons, and a line of content icons, respectively. When the array is scrolled vertically, icons of different contents in different media are displayed one after another. Therefore, the user will feel as if multiple contents were laid in the form of a matrix over the display screen.

Freely moving the matrix including the multiple contents, the user can select a desired content with a feeling as if he or she focuses his or her desired content. However, since not so many icons are actually displayed on the screen, the user will definitely recognize the icons on the display screen.

Just by designating a horizontal or vertical direction, the user can select contents one after another. Namely, the user can make the so-called zapping simply and smoothly.

A content icon of interest is always placed nearly in the center of the display screen 32. So the user can select a content with a feeling as if he peeped into a desired content from a window provided in the center of the display screen 32, and locate a content icon of interest at a glance even when he operates the remote commander 50 from a position apart from the display screen 32.

Therefore, the user can be rather relaxed in operating the remote commander 50 without having to intentionally locate a content icon of interest on the display screen 32.

In the initial menu screen having been described above, replay of a content corresponding to a content icon of interest displayed in the area of interest 300C can be started by pressing any of the control buttons on the remote commander 50, to which the setting function is assigned. When the set key is pressed, control information will be supplied to the display controller 80 via the remote commander 50, the image generator 84 will inhibit the image of the initial menu screen from being displayed, and the content controller 82 will start replaying the selected content.

When the user enters a command for calling the initial menu screen by operating the remote commander 50 during replay of the content, the initial menu screen will be displayed being superposed on the screen on which the content is being replayed. A status in which the replay of the content has been set is reproduced on the initial menu screen thus displayed.

Also, in this embodiment, a manipulating-function menu screen is provided in a layer under the initial menu screen. The manipulating-function menu will be opened by pressing a specific one of the control buttons on the remote commander 50.

The manipulating-function menu includes:

(1) one or more manipulating-function items such as edition, replay, deletion, etc., for example, of a content corresponding to a content icon of interest being displayed in the area of interest 300C; and (2) one or more manipulating-function items, such as change of arrayed order, of a plurality of content icons included in the content icon array 300.

The user selects a desired one of the manipulating-function items on the manipulating-function menu screen.

Note here that one or more manipulating-function items such as edition, replay, deletion, etc., for example, of a content correspond to a first group of manipulating-function items while one or more manipulating-function items for the plurality of content icons correspond to a second group of manipulating-function items.

In this embodiment, the initial menu screen also includes a control button display 400 showing the correspondence between the set key and control keys for opening the manipulating-function menu and the control buttons on the remote commander 50, as shown in FIG. 3. The control button display 400 shows letters for indicating control functions corresponding to the circle, triangle, square and cross marks provided on the tops of the four control buttons on the remote commander 50. In the example shown in FIG. 3, the control button 53 with a circle mark provided on the top thereof is assigned to a set key (Enter) and the control button 52 having a triangle mark on the top thereof is assigned to an option key (Option) for opening the manipulating-function menu screen.

As above, when the control button 53 as a set key on the remote commander 50 is pressed, a content corresponding to a content icon of interest will be replayed. Also, when the control button 52 as an option key on the remote commander 50 is pressed, there will be opened the manipulating-function menu screen which will be described below.

First Example of the Manipulating-Function Menu Screen

Figure 4A:
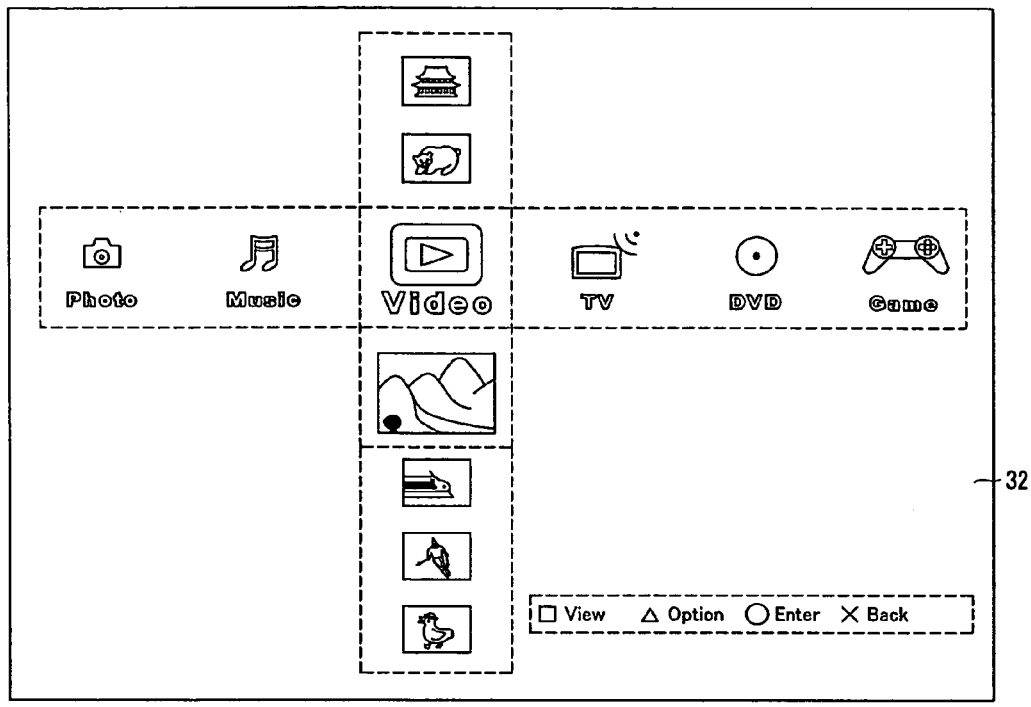
FIG. 4 explains the transition of an example of the initial menu screen to a manipulating-function menu screen in the player as the embodiment of the present invention.
Figure 4B:
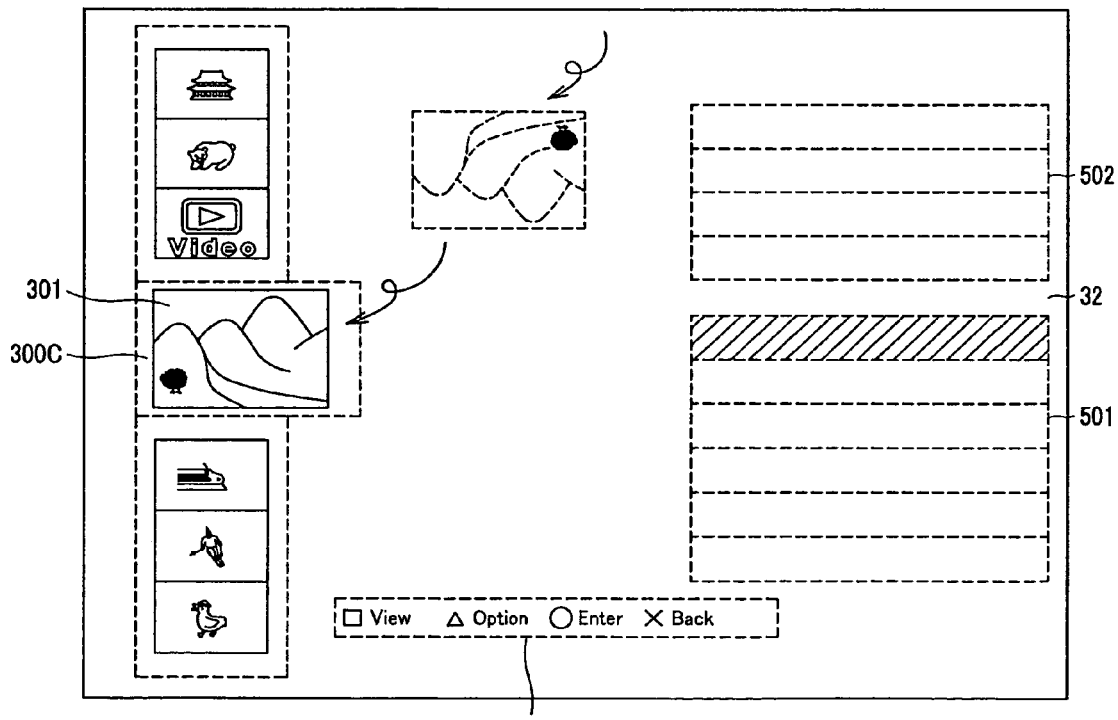

When the control button 52 as an option key on the remote commander 50 is pressed, the image generator 83 deletes the medium icon array 200, moves the content icon array 300 positioned nearly in the center of the initial menu screen as in FIG. 4A to the left end of the display screen 32 of the monitor display 30, and generates image data on a manipulating-function menu screen in which a menu 501 including the first group of manipulating-function items and a menu 502 including the second group of manipulating-function items are displayed in a space resulted from the deletion of the medium icon array 200 and movement of the content icon array 300, as shown in FIG. 4B, and the image data is sent to the display output unit 70. The display output unit 70 supplies the image data to the monitor display 30 to display the manipulating-function menu screen on the display screen 32 of the monitor display 30.

For moving the content icon array 300 when shifting from the initial menu screen to the manipulating-function menu screen, the effector 83 moves a content icon of interest in the area of interest 300C to the left end of the display screen 32 in FIG. 4B while rotating the image of the content icon. By rotating the image of the content icon of interest in the area of interest 300C, the user can visually recognize that the content icon array is being moved, and also can easily recognize where the content icon of interest has been moved.

As mentioned above, the first group of manipulating-function items in the menu 501 includes one or more manipulating-function items for a content corresponding to the content icon of interest (will be referred to as "content of interest" hereunder), that is, edit, protective set, rename, replay, replay resume and delete, in this example.

The manipulating function "edit" is to make a play list edition or the like for replaying only a predetermined part. The "protective set" is a function to provide a protection against content data deletion from the storage unit 90. The "rename" function is to rename the content title. The "replay" function can be performed by pressing the set key on the aforementioned initial menu screen. In this embodiment, however, the "replay" function is provided to replay a content of interest by selecting a corresponding function in the manipulating-function menu as well. The manipulating function "replay resume" is to be selected for resuming the replay of the content of interest at the end point of a preceding replay. The function "delete" is to delete the data in the content of interest from the storage unit 90.

In this example, the second group of manipulating-function items in the menu 502 includes one or more manipulating-function items for the entire content icon array 300 displayed at the left end of the display screen 32. In this example, it includes a plurality of changes of display order of content icons. The display-order change items include "ID-based ascending", "Date-based ascending", "Date-based descending" and "Title-based ascending" in this example.

The "ID-based ascending" is to arrange the content icons in an ascending order from the lowest ID number. The "Date-based ascending" is to arrange the content icons in an ascending order from the earliest date when the corresponding content was stored in the storage unit 90. The "Date-based descending" is to arrange the content icons in a descending order from the latest date when the corresponding content was stored in the storage unit 90. The "Title-based ascending" is to arrange the titles of contents in the alphabetic order.

By operating the vertical-directional portion of the cross-shaped directional button 56 on the remote commander 50, it is possible to select any of a plurality of manipulating-function items in the first group in the menu 501 of manipulating-function items and second group of manipulating-function items in the menu 502. For visual information to the user, a line including a manipulating-function item currently selected is displayed in a different color and transparency than those of the other lines.

Figure 5:
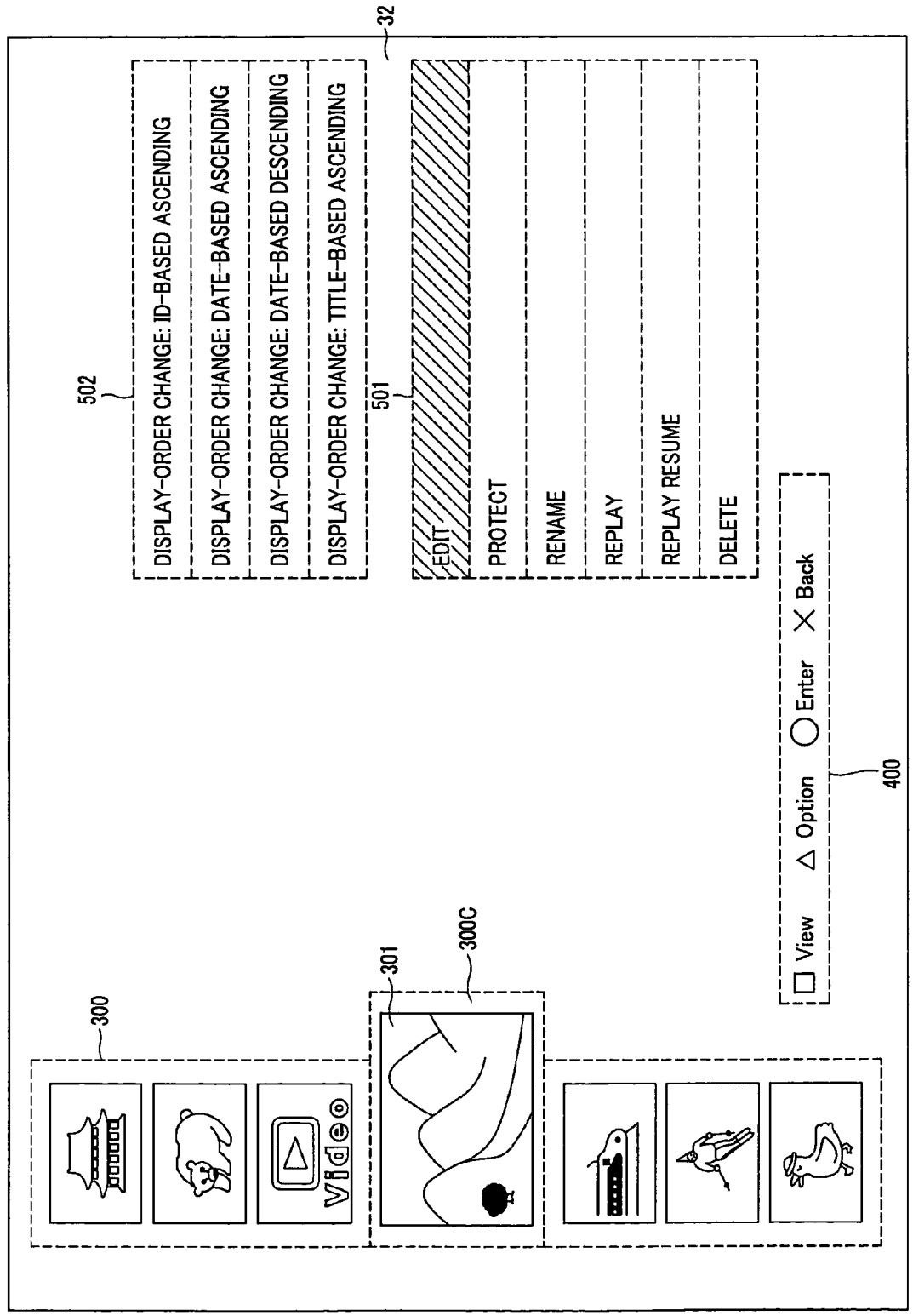
FIG. 5 shows a first example of the manipulating-function menu screen in the player as the embodiment of the present invention.

In this example, in the initial manipulating-function menu screen having replaced the initial menu screen, there is being selected the item "edit" in the first group of manipulating-function items in the menu 501 as shown in FIG. 5. In FIG. 5, the manipulating-function item being selected is displayed being hatched.

In this embodiment, while the manipulating-function item being selected is an item included in the first group of manipulating-function items in the menu 501, a content icon of interest in the content icon array 300 is displayed in a different color and size from those of the other content icons for differentiation from the latter, as shown in FIG. 5.

Figure 6:
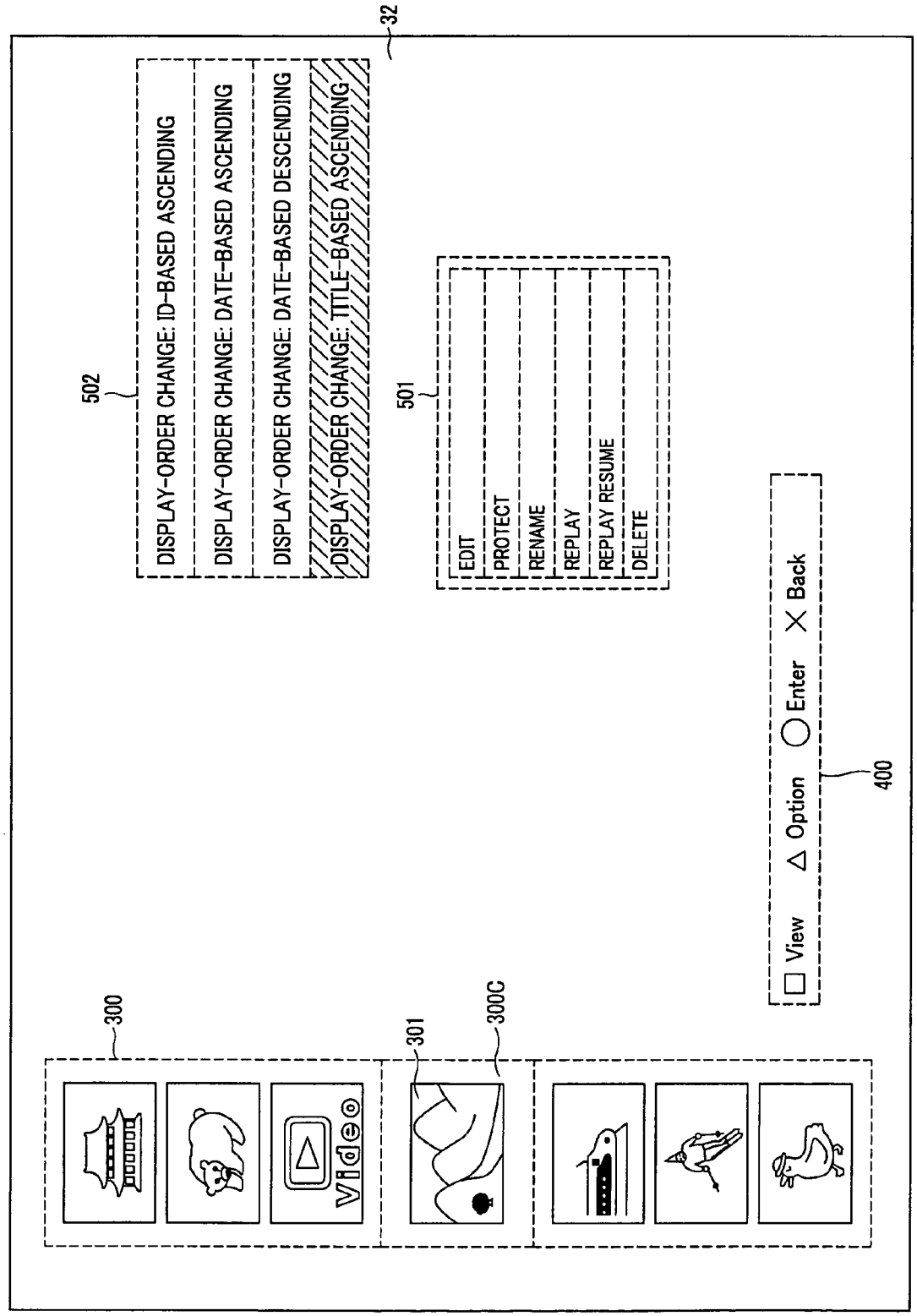
FIG. 6 shows the first example of the manipulating-function menu screen in the player as the embodiment of the present invention.

When the manipulating-function item being selected is replaced with a manipulating-function item in the second group of manipulating-function items in the menu 502 as shown in FIG. 6 by the user operating the cross-shaped directional button 56 on the remote commander 50, the content icon in the area of interest of the content icon array 300 is displayed in the same size and color as those of the other content icons for it is not necessary to differentiate only a content icon of interest from the other content icons because the manipulating-function items in the second group in the menu 502 are directed to any content of interest but to all contents in a medium of interest. Also, by displaying a content icon of interest in the same manner as that in which the other content icons are displayed, it can be informed to the user that a manipulating function is not being selected for one content of interest but a manipulating function for a plurality of contents, namely, all contents in one medium, is being selected in this example.

In this embodiment, for easier visual recognition of which of the menus 501 and 502 of the first and second groups of manipulating-function items, respectively, a manipulating function is being selected from, the group of manipulating-function items including a manipulating-function item being selected is displayed being emphasized with the display size thereof being made larger than that of the other group of manipulating-function items. The display in the larger size will lead to a larger display size of the letters of the selected manipulating-function item, which will help the user in selecting a manipulating-function item more easily.

Note that the emphasized display for differentiation between the menus 501 and 502 of the first and second manipulating-function items is not limited to the above-mentioned change of size, but this emphasis may also be done by displaying in different colors as in the aforementioned display of icons in the intersectional area 200C and area of interest 300C.

Figure 7:
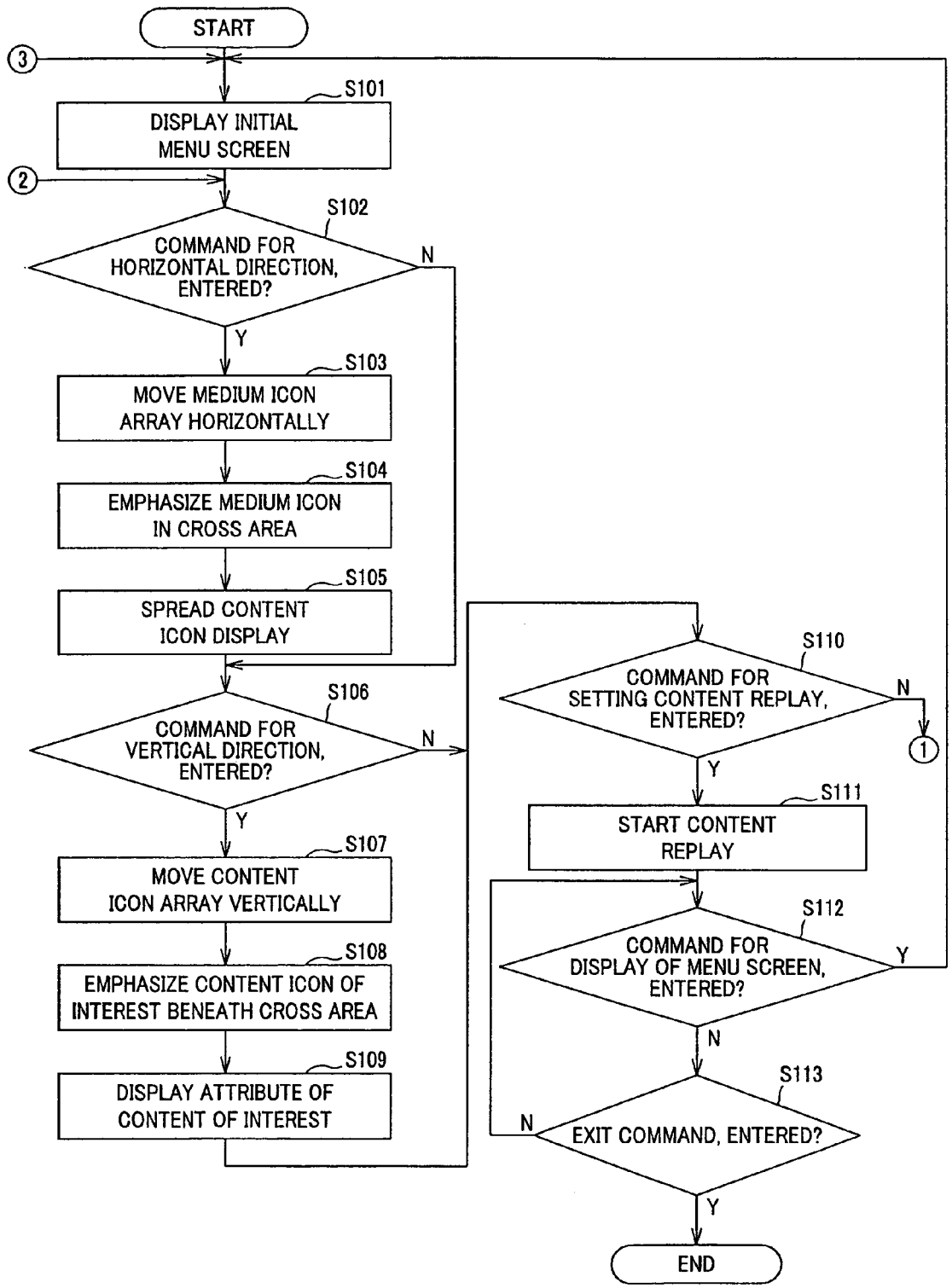
FIG. 7 shows a part of a flow of operations made in the substantial part of the player as the embodiment of the present invention.

Next, operations for display of the initial menu screen and manipulating-function menu screen in the multimedia player according to this embodiment as well as those made in response to commands entered by the user operating the remote commander 50 will be described below with reference to the flow diagrams in FIGS. 7 to 9. The steps in the flow diagrams are effected by the CPU in the multimedia player 20 according to a program stored in a memory such as ROM.

That is, when one of the buttons on the remote commander 50, which is assigned a function to display the initial menu screen, for example, the start button 57, is pressed while a content is being replayed at the multimedia player, the image generator 84 is supplied with image information on ID small images such as medium icon and content icon from the storage unit 90, generates image data on the initial menu screen, and supplies the image data to the monitor display 30 via the display output unit 70. Therefore, the aforementioned initial menu screen as shown in FIG. 3 is displayed on the display screen 32 of the monitor display 30 (in step S101).

Next, the CPU in the multimedia player 20 judges whether a command for horizontal direction has been entered by the user pressing the cross-shaped direction button 56 on the remote commander 50 (in step S102). When the result of judgment is affirmative, namely, when it is determined that the command for horizontal direction has been so entered, the effector 83 will move the medium icon array 200 on the initial menu screen in any designated horizontal direction (in step S103).

Then, the CPU controls the effector 83 and image generator 84 to emphasize a medium icon set in the intersectional area 200C (in step S104), and it is supplied with a plurality of content icons for the medium from the storage unit 90 and displays the plurality of content icons in a vertical array crossing the intersectional area 200C (in step S105).

Next, when it is determined in step S102 that the command for horizontal direction has not been entered or when the content icons are displayed in the vertical array in step S105, the CPU will judge whether a command for vertical direction has been entered by the user pressing the cross-shaped directional button 56 on the remote commander 50 (in step S106).

When it is determined in step S106 that the command for vertical direction has been so entered, the effector 83 will move the content icon array 300 on the initial menu screen in any vertical direction (in step S107).

Then, the CPU controls the effector 83 and image generator 84 to emphasize a content of interest in the area of interest 300C (in step S108), and display the attributes of a content corresponding to the emphasized content icon of interest at the right (in step S109). When it is determined in step S106 that the command for vertical direction has not been entered, the CPU will skip over steps S107 to S109.

Next, the CPU will judge whether the control button 53 corresponding to the set (enter) key has been pressed on the remote commander 50 (in step S110). When it is determined that a content replay set command has been entered, the CPU will delete the initial menu screen and replay the content of interest (in step S111).

Next, the CPU judges whether a command for displaying the initial menu screen has been entered while the content of interest is being displayed (whether the start button 57 has been pressed) (in step S112). When it is determined that the command has been so entered, the CPU will return to step S101 where it will display the initial menu screen on the image being displayed.

When it is determined in step S112 that the command for displaying the initial menu screen has not been entered, the CPU will judge whether a quit command has been entered (whether the control button 54 has been pressed, for example) (in step S113). When it is determined that the quit command has not been entered, the CPU will go back to step S112. On the contrary, when it is determined that the quit command has been so entered, the CPU will quit this operation routine.

Figure 8:
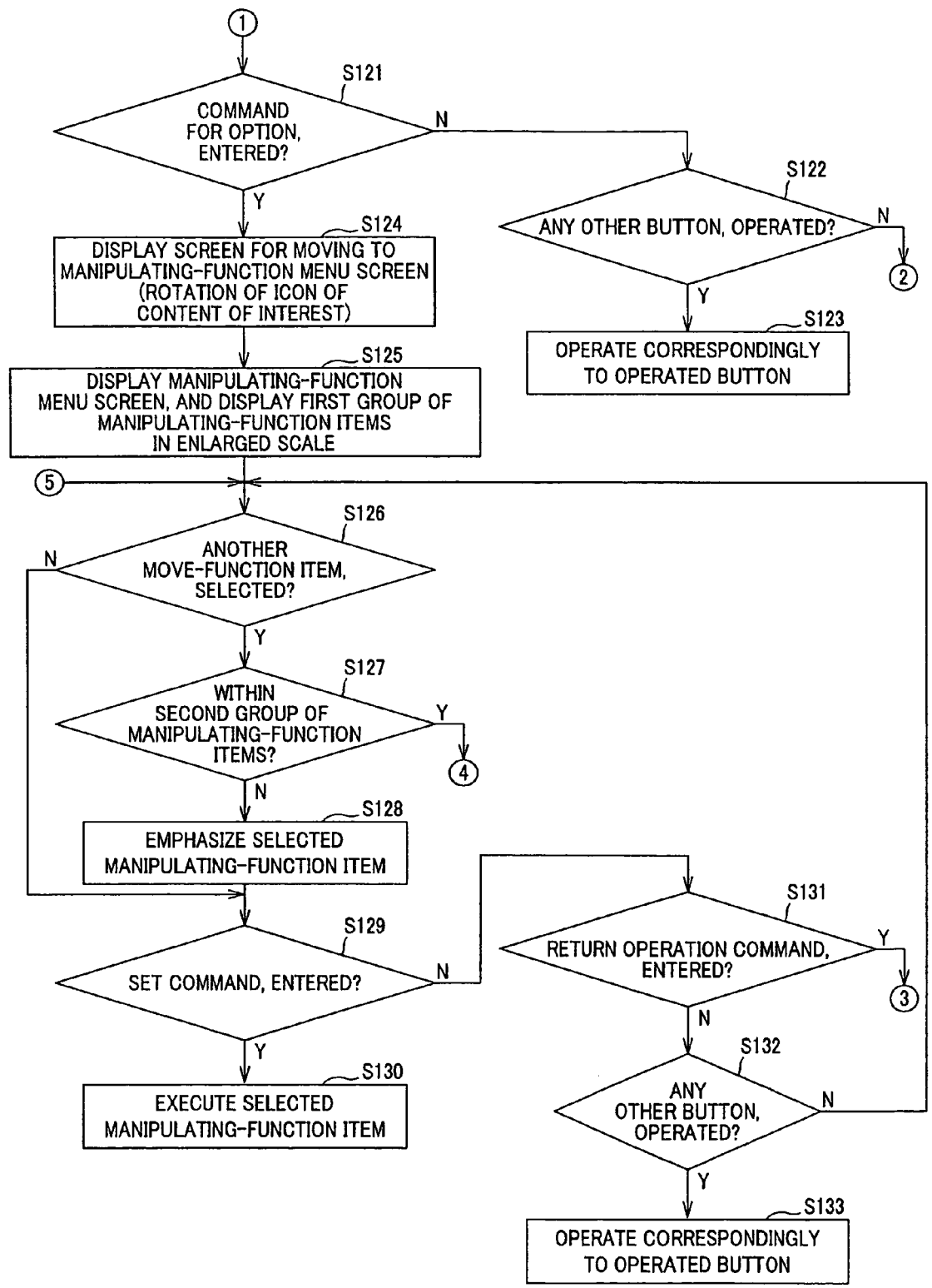
FIG. 8 shows a part of the flow of operations made in the substantial part of the player as the embodiment of the present invention.

Also, when it is determined in step S110 that the content replay set command has not been entered, the CPU will judge whether the control button 52 on the remote commander 50 has been pressed to enter a command for option (in step S121 in FIG. 8). When it is determined that the command for option has not been entered, the CPU will judge whether any other control button has been operated (in step S122). When it is determined that no other control button has been operated, the CPU will go back to step S102 where it will repeat steps including S102 and subsequent steps. When it is determined in step S122 that any other button has been operated, the CPU will perform an operation corresponding to the operated button (in step S123).

When it is determined in step S121 that the command for option has been entered, the CPU will move the content icon array 300 to the left end of the display screen 32 while rotating the content icon of interest as shown in FIG. 4B (in step S124).

Then the CPU will position the content icon array 300 at the left end of the display screen 32 and display the menu 501 including the first group of manipulating-function items and menu 502 including the second group of manipulating-function items on the manipulating-function menu screen (in step S125). As having been described above, since a manipulating-function item being selected is taken as an item included in the first group of manipulating-function items in the menu 501 in this condition, the content icon of interest will be displayed in a larger size than that of the other content icons as shown in FIG. 5.

Next, the CPU judges whether another manipulating-function item has been selected by operating the cross-shaped directional button 56 on the remote commander 50 (in step S126). When it is determined that any other manipulating-function item has not been selected, the CPU will judge whether a set command has been entered by operating the control button 53 (in step S129). When it is determined that the set command has been so entered, the CPU will carry out the selected manipulating-function item (in step S130).

When it is determined in step S129 that no set command has been entered, the CPU will judge whether a command for return operation has been entered by pressing the control button 54 on the remote commander 50 (in step S131). When it is determined that the return operation command has been so entered, the CPU will go back to step S101 where it will display the initial menu screen on the display screen 32. When it is determined in step S131 that no return operation command has been so entered, the CPU will judge whether any other button has been operated (in step S132). When it is determined that any other button has not been operated, the CPU will go back to step S126 where it will repeat steps including S126 and subsequent steps. Also, when it is determined in step S132 that any other button has been operated, the CPU will perform a manipulating function corresponding to the operated button (in step S133).

Also, when it is determined in step S126 that another manipulating-function item has been selected, the CPU will judge whether the selected other manipulating-function item is a manipulating-function item included in the second group in the menu 502 (namely, the manipulating-function item has been shifted from one included in the first group of manipulating-function items in the menu 501 to one included in the second group of manipulating-function items in the menu 502) (in step S127). When it is determined in step S127 that the selected other manipulating-function item is one included in the first group of manipulating-function items in the menu 501, the CPU will display the selected manipulating-function item in a different color from that of other items for differentiation between them (in step S128). Thereafter, the CPU goes to step S129 where it will repeat steps including S129 and subsequent steps.

When it is determined in step S127 that the selected other manipulating-function item belongs to the second group of manipulating-function items in the menu 502, the CPU will display the menu 502 including the second group of manipulating-function items in a larger size while changing the enlarged display of the menu 501 including the first group of manipulating-function items to the normal-size one. Then, the CPU will show the manipulating-function item selected from the first group in a color different from that of the other manipulating-function items (in step S141 in FIG. 9).

Next, the CPU judges whether another manipulating-function item has been selected by operating the cross-shaped directional button 56 on the remote commander 50 (in step S142). When it is determined that any other manipulating-function item has not been selected, the CPU will judge whether a set command has been entered by operating the control button 53 (in step S145). When it is determined that the set command has been so entered, the CPU will carry out the selected manipulating-function item (in step S146).

When it is determined in step S145 that no set command has been entered, the CPU will judge whether a command for return operation has been entered by pressing the control button 54 on the remote commander 50 (in step S147). When it is determined that the return operation command has been so entered, the CPU will go back to step S101 where it will display the initial menu screen on the display screen 32. Also, when it is determined in step S147 that no return operation command has been so entered, the CPU will judge whether any other button has been operated (in step S148). When it is determined that any other button has not been operated, the CPU will go back to step S142 where it will repeat steps including S142 and subsequent steps. Also, when it is determined in step S148 that any other button has been operated, the CPU will perform a manipulating function corresponding to the operated button (in step S149).

Also, when it is determined in step S143 that another manipulating-function item has been selected, the CPU will judge whether the selected other manipulating-function item is a manipulating-function item included in the first group of manipulating-function items in the menu 501 (namely, the manipulating-function item has been shifted from one included in the second group of manipulating-function items in the menu 502 to one included in the first group of manipulating-function items in the menu 501) (in step S143). When it is determined in step S143 that the selected other manipulating-function item is one included in the second group of manipulating-function items in the menu 502, the CPU will display the selected manipulating-function item in a different color from that of other items for differentiation between them (in step S144). Thereafter, the CPU goes to step S145 where it will repeat steps including S145 and subsequent steps.

Figure 9:
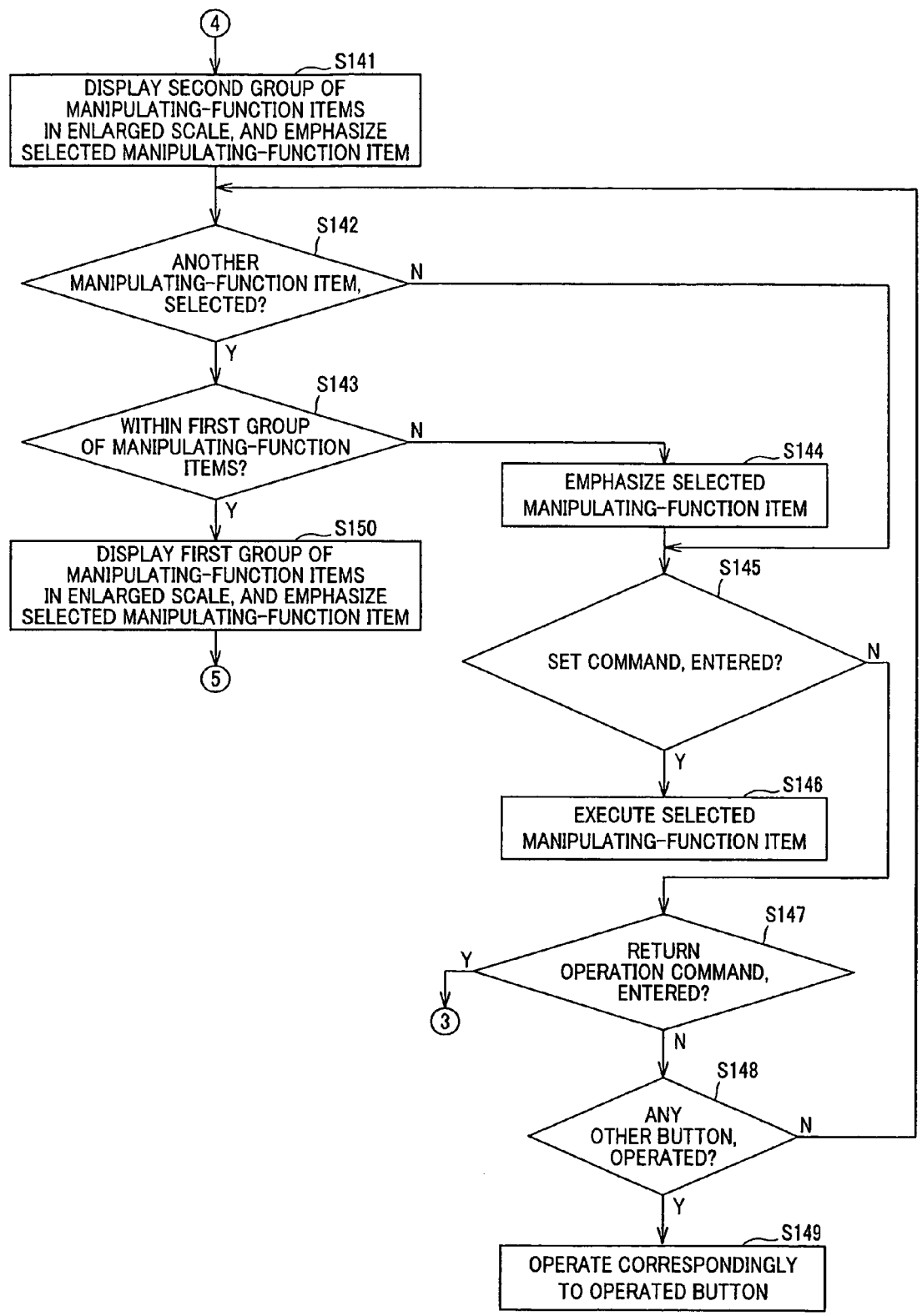
FIG. 9 shows a part of the flow of operations made in the substantial part of the player as the embodiment of the present invention.

When it is determined in step S143 that the selected other manipulating-function item belongs to the first group of manipulating-function items in the menu 501, the CPU will display the menu 501 including the first group of manipulating-function items in a larger size while changing the enlarged display of the menu 502 including the second group of manipulating-function items to the normal-size one, and display the selected one of the manipulating-function items in the first group in the menu 501 in a different color from those of the other manipulating-function items (in step S150 in FIG. 9). Thereafter, the CPU will go back to step S126 where it will repeat steps including S126 and subsequent steps.

Note that although a manipulating-function item is being selected from the first group of the manipulating-function items in the menu 501 when the display on the display screen 32 is changed from the initial menu screen to the manipulating-function menu screen as having been described above, the manipulating-function menu screen as shown in FIG. 6 may be displayed while one of the manipulating-function items in the second group in the menu 502 is being selected.

Second Example of the Manipulating-Function Menu Screen

A second example of the user interface will be described below with reference to FIGS. 10 to 13. Also in this second example, the initial menu screen showing medium and content icon arrays 200 and 300 intersecting each other is quite the same as that in the first example except for the manipulating-function menu opened by operating an option key (control button 52 on the remote commander 50) while the initial menu screen is being displayed as shown in FIG. 10A.

Figure 10A:
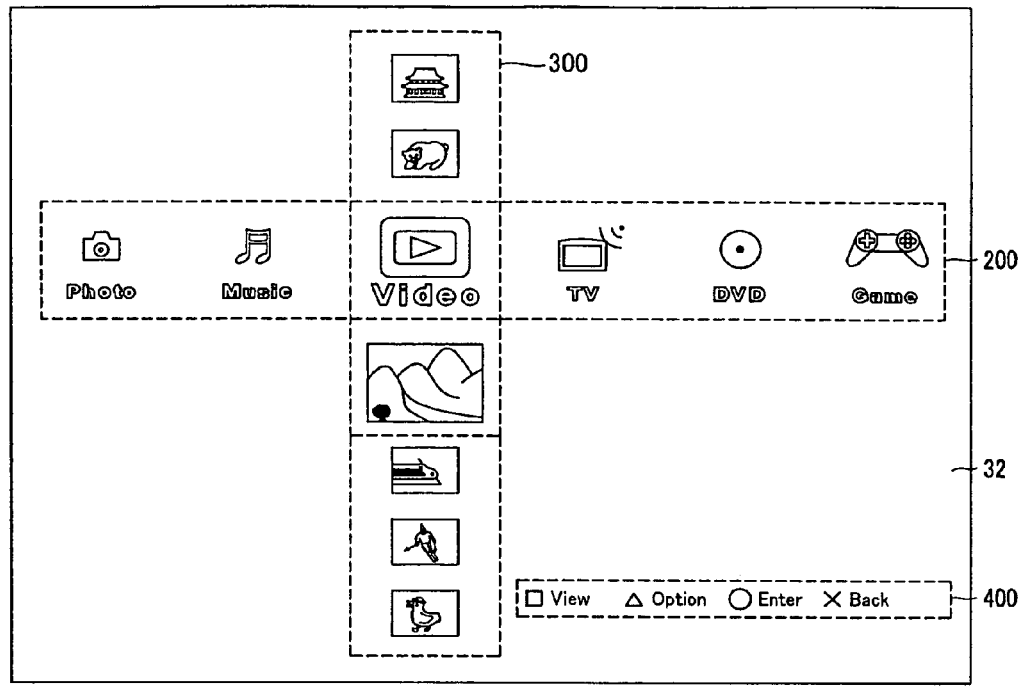
FIG. 10 explains a second example of the manipulating-function menu screen in the player as the embodiment of the present invention.
Figure 10B:
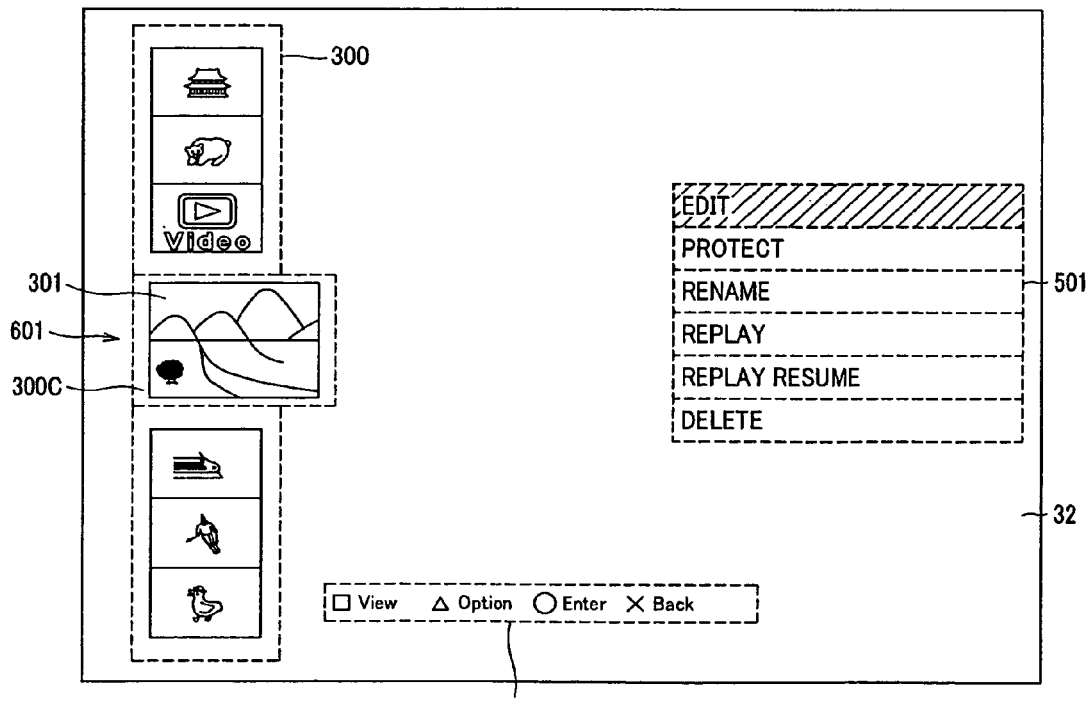

More specifically, in the second example, when the control button 52 as the option key is operated, the image generator 84 deletes the medium icon array 200 in the initial menu screen in FIG. 10A, moves the content icon array 300 located nearly in the center of the display screen 32 of the monitor screen 30 to the left end of the display screen 32 as shown in FIG. 10B, and generates image data on a first manipulating-function menu screen showing the menu 501 including the first group of manipulating-function items in a space resulted from the deletion of the medium icon array 200 and movement of the content icon array 300, and the image data is sent to the display output unit 70. The display output unit 70 supplies the image data to the monitor display 30 which will display the first manipulating-function menu screen as a manipulating-function menu screen on the display screen 32 thereof.

Therefore, it is possible to select one of the manipulating-function items in the first group in the menu 501 on the first manipulating-function menu screen.

Note that the multimedia player 20 may be adapted so that in shifting the screen from the initial menu screen to the first manipulating-function menu screen, the content icon array 300 can be moved by the effector 83 to the left end of the display screen 32 in FIG. 10B while rotating the image of a content icon of interest in the area of interest 300C as in the first example.

Figure 11A:
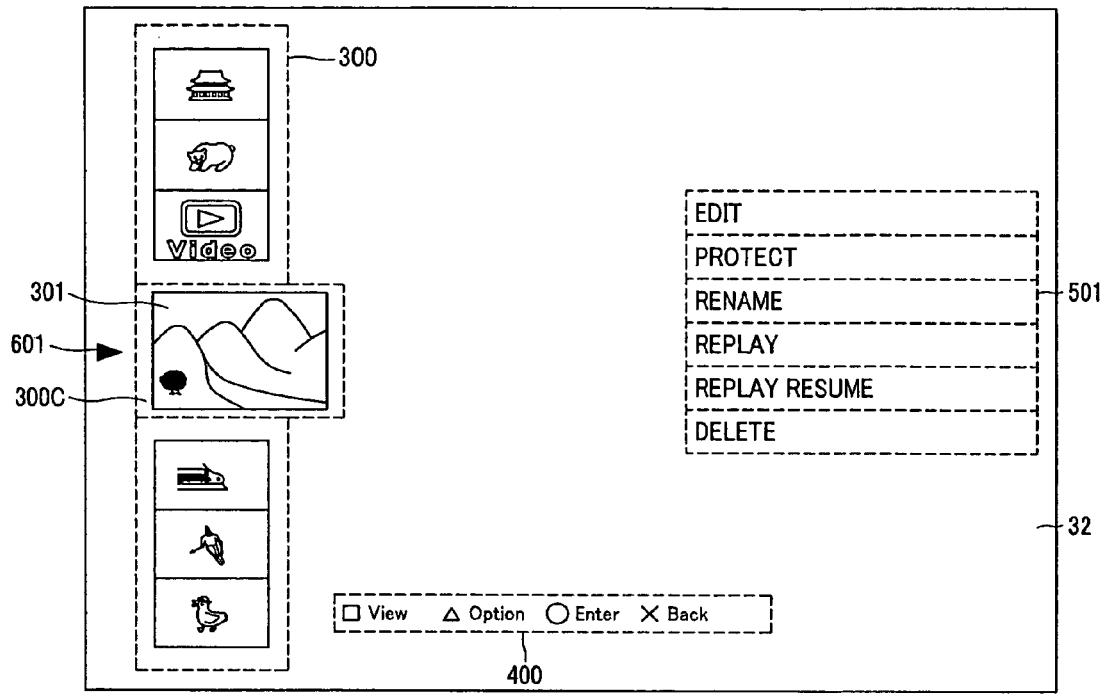
FIG. 11 explains the second example of the manipulating-function menu screen in the player as the embodiment of the present invention.

In the first manipulating-function menu screen, a triangular mark 601 directed rightward is displayed as shown in FIG. 10B. FIG. 11A shows the first manipulating-function menu screen which is quite the same as that in FIG. 10B.

The triangular mark 601 directed rightward in the first manipulating-function menu screen corresponds to a command for rightward direction, entered by operating the cross-shaped directional button 56 on the remote commander 50. Namely, it is a reminding marking. When a rightward-directional command is entered by operating the cross-shaped directional button 56 on the remote commander 50, the image generator 84 will move the content icon array 300 rightward from the center of the display screen 32 as shown in FIG. 11B, delete the first group of manipulating-function items in the menu 501, generates image data on the second manipulating-function menu screen in which the second menu 502 including the second group of manipulating-function items in a left space of the display screen 32, taking place due to the rightward movement of the content icon array 300, and supply the image data to the display output unit 70.

The display output unit 70 supplies the image data to the monitor display 30 which will display the image data as a manipulating-function menu screen on the display screen 32 thereof. In this second manipulating-function menu screen, there can be selected a desired manipulating-function item from the menu 502 including the second group of manipulating-function items.

Figure 11B:
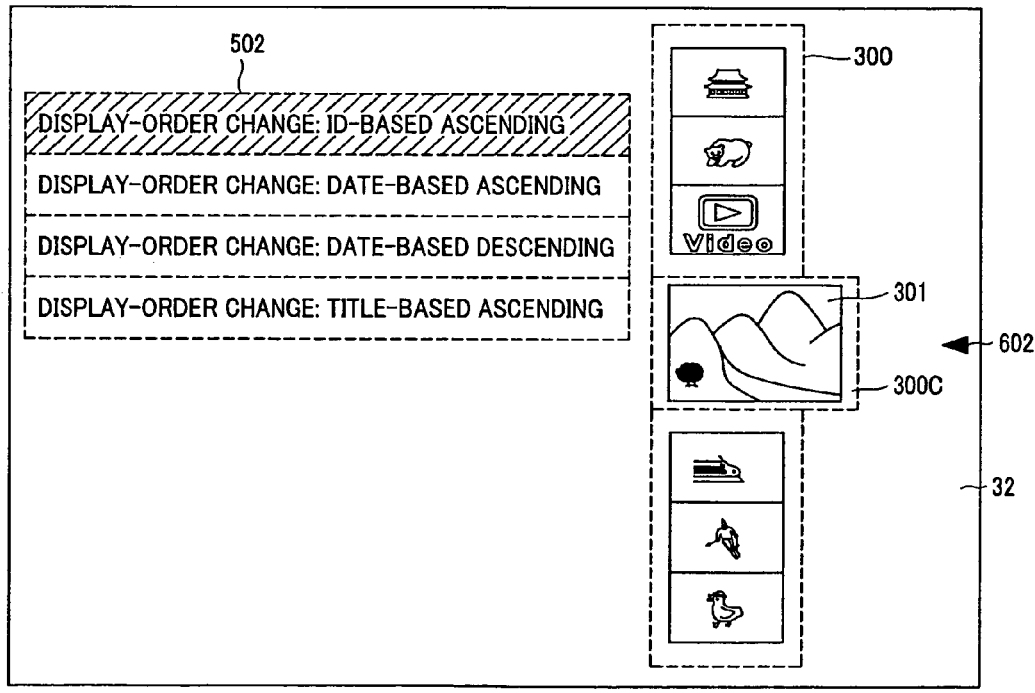

In the second manipulating-function menus screen, a triangular mark 602 directed leftward will appear as shown in FIG. 11B.

The triangular mark 602 directed leftward in the second manipulating-function menu screen corresponds to a command for leftward direction, entered by operating the cross-shaped directional button 56 on the remote commander 50. Namely, it is a reminding marking. When a rightward-directional command is entered by operating the cross-shaped directional button 56 on the remote commander 50, the manipulating-function menu screen displayed on the display screen 32 of the monitor screen 30 shifts back to the first manipulating-function menu screen in which the menu 501 including the first group of manipulating-function items is displayed.

In this second example, in the second manipulating-function menu screen, the content icon of interest 301 in the area of interest 300C remains displayed in the large size as shown in FIG. 11B. Since the second manipulating-function menu screen is intended for selection of any of the manipulating-function items in the menu 502 including the second group of manipulating-function items, however, the multimedia player 20 may be adapted so that the content icon of interest 301 is displayed in the same manner as that the other content icons are displayed as in FIG. 6, not in the larger size.

In the second example, the menu 501 including the first group of manipulating-function items and menu 502 including the second group of manipulating-function items are displayed at the right and left, respectively, of the content icon array 300, which permits the user to readily know whether the menu screen is intended for selection of a manipulating-function item for a content of interest or for a plurality of contents.

Also, since the menu 501 including the first group of manipulating-function items and menu 502 including the second group of manipulating-function items are not displayed simultaneously in one display screen but only one of them is displayed along with the content icon array, so the space for display of the group of manipulating-function items can be formed larger to provide an easier-to-view menu display.

Next, there will be described with reference to flow diagrams in FIGS. 12 and 13 operations made in displaying the initial menu screen and manipulating-function menu screen, and those made in response to a command entered by the user operating the remote commander 50, in the second example in this embodiment of the multimedia player according to the present invention. It should be noted that the operation in each step of these flow diagrams is performed by the CPU in the multimedia player 20 according to a program stored in a memory such as ROM or the like.

That is to say, the operations related to the initial menu screen are quite the same as those concerning the first example of manipulating-function menu screen. The operation in each of steps having been described above with reference to FIG. 7 is quite the same as in this second example.

The second example is different from the first example in operations which will be made after it is determined in step S110 that no content replay set command has been entered.

Figure 12:
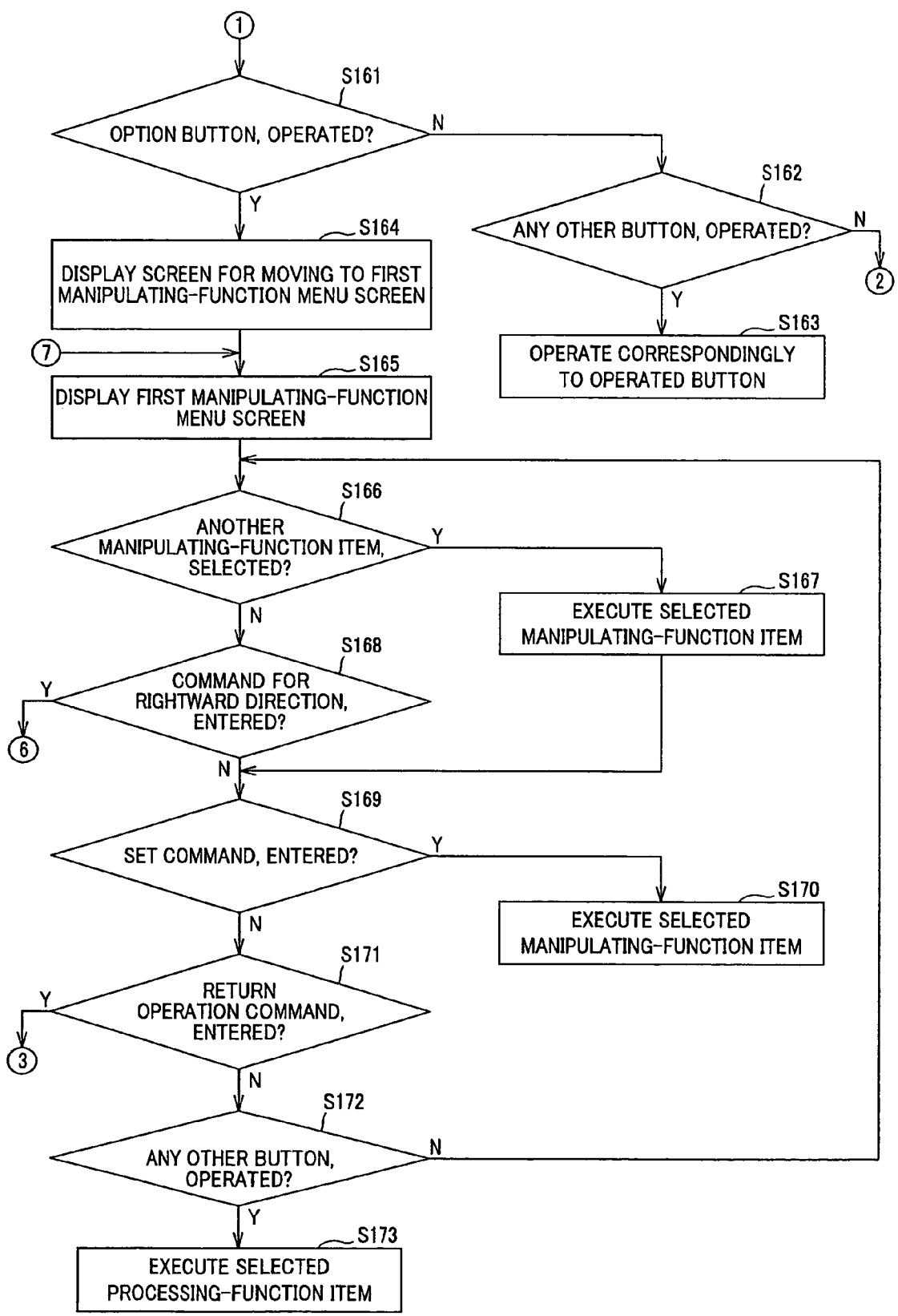
FIG. 12 shows a part of a flow of operations made in the substantial part of the player as the embodiment of the present invention.

More specifically, when it is determined in step S110 that no content replay set command has been entered, the CPU will judge whether a command for option has been entered by pressing the control button 52 on the remote controller 50 (in step S161 in FIG. 12). When it is determined that no such command has been so entered, the CPU will return to step S102 in FIG. 7 where it will repeat steps including step S102 and subsequent steps. Also, when it is determined in step S62 that any other control button is operated, the CPU will perform an operation corresponding to the operated control button (in step S163).

When it is determined in step S161 that the option command has been entered, the CPU will move the content icon array 300 to the left end of the display screen 32 while rotating the content icon of interest, in this example as shown in FIG. 10B (in step S164).

Then, the CPU will thus position the content icon array 300 at the left end of the display screen 32 as shown in FIG. 10B and display the first manipulating-function menu screen including only the first group of manipulating-function items in the menu 501 (in step S165). As mentioned above, since a manipulating-function item being selected is regarded in this condition as being included in the first group of manipulating-function items in the menu 501, the CPU will display the content icon of interest 301 in a larger size than that of the other content icons as shown in FIG. 5.

Next, the CPU judges whether another manipulating-function items has been selected by operating the cross-shaped directional button 56 on the remote commander 50 (in step S166). When it is determined that another manipulating-function item has been so selected, the CPU will display the selected manipulating-function item in a different color from that of the other items for differentiation from the other items (in step S167). Next, the CPU will judge whether a set command has been entered by operating the control button 53 (in step S169).

When it is determined in step S166 that any other manipulating-function item has not been selected, the CPU will judge whether a command for rightward direction has been entered by operating the cross-shaped directional button 56 on the remote commander 50 (in step S168). When it is determined that no command from rightward direction has been so entered, the CPU will judge whether a set command has been entered by pressing the control button 53 (in step S169).

Then, when it is determined in step S169 that a set command has been so entered, the CPU will perform the selected manipulating-function item (in step S170). Also, when it is determined in step S169 that no set command has been entered, the CPU will judge whether a return operation command has been entered by pressing the control button 54 on the remote commander 50 (in step S171). When it is determined that no return operation command has been so entered, the CPU will go to step S101 in FIG. 7 where it will display the initial menu screen on the display screen 32.

Also, when it is determined in step S171 that no return operation command has been entered, the CPU will judge whether any other button has been operated (in step S172). When it is determined that any other button has not been operated, the CPU will go back to step S166 where it will repeat steps including step S166 and subsequent steps.

When it is determined in step S172 that any other button has been operated, the CPU will perform an operation corresponding to the operated button (in step S173).

Figure 13:
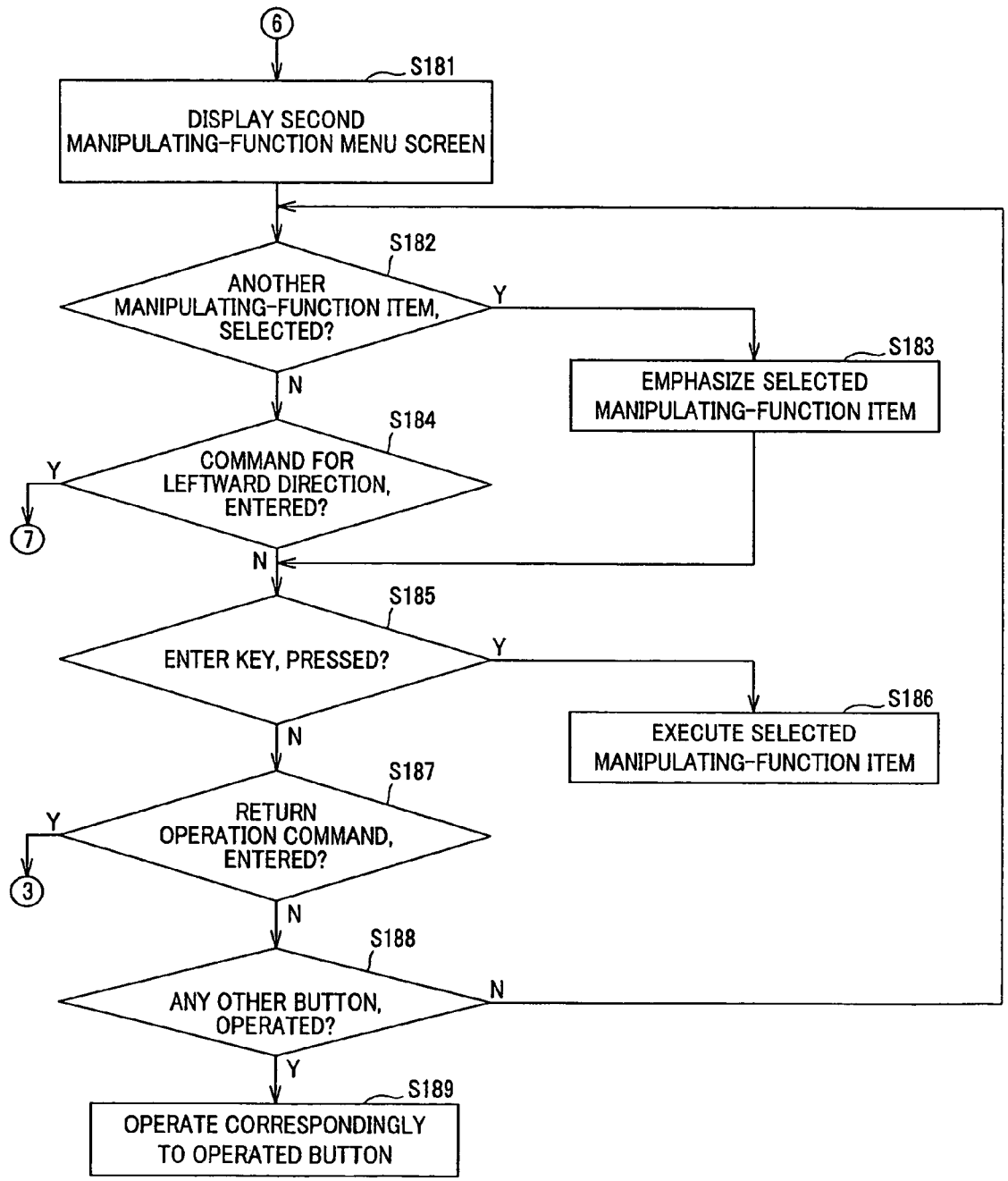
FIG. 13 shows a part of the flow of operations made in the substantial part of the player as the embodiment of the present invention.

When it is determined in step S168 that a rightward direction command has been entered by operating the cross-shaped direction button 56 on the remote commander 50, the CPU will control the image generator 84 to generate, as mentioned above, a second manipulating-function menu screen which will be displayed on the display screen 32 of the monitor display 30 as shown in FIG. 11B (in step S181 in FIG. 13).

Next, the CPU judges whether another manipulating-function item has been selected by operating the cross-shaped directional button 56 on the remote commander 50 (in step S182). When it is determined that another manipulating-function item has been so selected, the CPU will display the selected manipulating-function item in a different color from that of the other manipulating-function items for differentiation from the other manipulating-function items (in step S183). Next, the CPU will judge whether a set command has been entered by operating the control button 53 (in step S185).

Also when it is determined in step S182 that any other manipulating-function item has been so selected, the CPU will judge whether a command for leftward direction has been entered by operating the cross-shaped directional button 56 on the remote commander 50 (in step S184). When it is determined that the leftward direction command has been so entered, the CPU will go back to step S165 in FIG. 12 where it will display the first manipulating-function menu screen on the display screen 32 of the monitor display 30. Also, when it is determined in step S184 that no command for leftward direction has been entered, the CPU will judge whether a set command has been entered by pressing the control button 53 (in step S185).

Then, when it is determined in step S185 that a set command has been entered, the CPU will perform the selected manipulating-function item (in step S186). Also, when it is determined in step S185 that no set command has been entered, the CPU will judge whether a return operation command has been entered by pressing the control button 54 on the remote commander 50 (in step S187). When it is determined that no return operation command has been so entered, the CPU will go to step S101 in FIG. 7 where it will display the initial menu screen on the display screen 32.

Also, when it is determined in step S187 that no return operation command has been entered, the CPU will judge whether any other button has been operated (in step S188). When it is determined that any other button has not been operated, the CPU will go back to step S182 where it will repeat steps including step S182 and subsequent steps.

When it is determined in step S188 that any other button has been operated, the CPU will perform an operation corresponding to the operated button (in step S189).

Since in both the aforementioned first and second examples, the group of manipulating-function items for a content of interest and the group of manipulating-function items for a plurality of contents can be displayed in the form of a menu for ready differentiation between them as having been described above, the user will be able to easily select a desired one of the manipulating-function items without any confusion in differentiating between the manipulating-function items.

For example, although the initial menu screen is first shifted to the first manipulating-function menu screen in the aforementioned embodiment, it may first be shifted to the second manipulating-function screen.

Also, it is of course that the correspondence between the control buttons on the remote commander 50 and functions indicated with letters in the control button 400 is not limited to the aforementioned one.

In the aforementioned embodiment, the manipulating-function menu screen is displayed by operating the predetermined key such as the option key in the initial menu screen with the medium icon array and content icon array intersecting each other. However, the multimedia player may be adapted so that a medium type can be selected by any other method of selecting on the type of a medium, only the content icon array be displayed as an initial menu screen on the screen on which replay is being made, and then the initial menu screen can be shifted to a manipulating-function menu screen.

Also, the multimedia player mat be adapted so that when making a selection between the first and second manipulating-function menu screens, a content icon of interest can be rotated to help the user to readily know that the content icon of interest is being moved and where the content icon of interest after moved lies.

[Other Variants]

The aforementioned multimedia player is arranged to replay a content, but it may be adapted to replay a medium. This variation is applicable to a manipulating-function item for each medium and a manipulating-function item for a plurality of media. Change of displayed order of medium icons is an example of such a manipulating-function item for a plurality of medium, for example.

The manipulating-function item for a plurality of to-be-replayed objects may not only be directed to the displayed order of the icons for the to-be-replayed objects but to the plurality of objects themselves. The manipulating-function items may include deletion, dubbing and other manipulations of contents in a group of a plurality of contents, for example.

Also, the aforementioned embodiment is an application of the present invention to a multimedia player. However, the present invention is not limited to the multimedia player but may be applied to a single-medium player destined for replay of contents.

Also, in the aforementioned embodiment, the initial menu screen is designed so that the intersectional area 200C is displayed right above the area of interest 300C. However, the initial menu screen may be designed so that the intersectional area 200C is located beneath or near the area of interest 300C, for example, so long as this geometry is such that the user can easily confirm a medium icon while looking at a content icon of interest.

Also in the aforementioned embodiment, the medium icon array 200 and content icon array 300 are displayed horizontally and vertically, respectively, on the display screen 32. However, the multimedia player may be adapted so that these arrays 200 and 300 are displayed obliquely, respectively.

Further in the aforementioned embodiment, the medium icon and content icon in the intersectional area 200C and area of interest 300C on the display screen 32 are displayed being emphasized. As a variant, however, the multimedia player 20 may be adapted so that an icon in the center of the display screen 32 can be relatively emphasized by displaying other icons than the medium icon and content icon of interest in the intersectional area 200C and area of interest 300C in color gradation from these areas toward the ends of the display screen 32. This color gradation may be such that the brightness and color saturation is lowered in directions toward the ends of the display screen 32, for example, or the $\alpha$ value (alpha blend value) for blending with a content image being replayed in the background area 34 on the display screen 32 is decreased in directions toward the ends of the display screen 32.

In the foregoing, there have been illustrated and described the multimedia player 20 in which the intersectional area 200C and area of interest 300C are displayed generally in the center of the display screen 32. However, the multimedia player may be designed so that the user can freely set positions where the intersectional area 200C and area of interest 300C are displayed. Namely, although the intersectional area 200C and area of interest 300C should preferably be displayed in the center of the display screen 32 in principle, the multimedia player may be adapted so that the displayed positions of the areas may be set freely and flexibly by the user to his or her own taste.

Some more variants will be described below. Although a medium icon is selected by entering a command for vertical scroll in the aforementioned embodiment, the multimedia player may be adapted so that selection of a medium icon can be set with a definite set command entered by the user.

Similarly, a content icon is selected by entering a command for horizontal scroll in the aforementioned embodiment. However, the multimedia player may be adapted so that selection of a content icon can be set with a definite set command entered by the user.

In the aforementioned embodiment, there is always displayed the medium icon array 200 on the menu screen. However, the multimedia player may be adapted so that there is always displayed the content icon array 300 on the menu screen without displaying any medium icon array or neither the medium icon array 200 nor the content icon array 300 are displayed on the menu screen. In these cases, the layout of the menu screen can flexibly be set to the user's taste because constant display of a content icon of interest will allow the user to easily know in which medium the content icon is included.

In the menu screen in the aforementioned embodiment, only a content corresponding to a medium icon positioned in the intersectional area 200C is displayed as the content icon array 300. According to the present invention, however, the multimedia player may be adapted so that multiple content icons are displayed in the form of a matrix over the display screen 32 by displaying other media, for example, contents corresponding to all the media, in a content icon array in the initial menu screen. Even in this case, however, one area of interest 300C is provided as in the aforementioned embodiment and a content icon displayed in the area of interest 300C is taken as an icon for a content of interest.

In this case, other content icons than in a central content icon array 300 may be displayed in a different manner than that for the content icon array 300, for example, with a lower brightness and color saturation.

Further, the aforementioned multimedia player as the embodiment of the present invention is not provided with any display but the present invention can of course provide a multimedia player having a display.

In the foregoing, the present invention has been described in detail concerning a certain preferred embodiment thereof as an example with reference to the accompanying drawings. However, it should be understood by those ordinarily skilled in the art that the present invention is not limited to the embodiment but can be modified in various manners, constructed alternatively or embodied in various other forms without departing from the scope and spirit thereof as set forth and defined in the appended claims.

What is claimed is:

1. A playback device comprising:
  a command input unit to accept a manipulation command entered by a user;
  a display controller to generate image data on a manipulating-function menu screen including a plurality of identification miniature images for respective ones of a plurality of to-be-replayed objects; and
  a display output unit to output the manipulating-function menu screen image data from the display controller to a display unit,
  the display controller functioning to:
  display the plurality of identification miniature images for respective ones of the plurality of to-be-replayed objects simultaneously on one display screen with taking one of the to-be-replayed objects corresponding to one of the identification miniature images in a predetermined position as a to-be-replayed object of interest,
  while displaying a first group of a plurality of manipulating-function items for each of the to-be-replayed objects and a second group of a plurality of manipulating-function items for each of the plurality of to-be-replayed objects so that one of the manipulating-function items can be selected by an operation made via the command input unit, with an indication of which one of the manipulating-function items is being selected; and
  display, during selection of any one of the manipulating-function items included in the first group, the identification miniature image corresponding to the to-be-replayed object of interest in such a manner that the identification miniature image can be differentiated from the other identification miniature images,
  wherein a plurality of types of media can be replayed, a plurality of contents in each of the media can be replayed, and the to-be-replayed object is the content that can be replayed;
  the identification miniature images corresponding to the to-be-replayed objects are taken as first identification miniature images while the identification miniature images corresponding to the respective ones of the plurality of types of media are taken as second identification miniature images;
  the display controller functions to:
  display a menu in which the plurality of first identification miniature images is arrayed in a first display area extending in a first direction on the display screen and the plurality of second identification miniature images is arrayed in a second display area extending in a second direction, the first and second display areas intersecting near a center of the display screen, and a content corresponding to one of the first identification miniature images positioned near the intersection is taken as a content in the to-be-replayed object of interest; and
  display, in the display screen displaying the menu having displayed thereon the intersecting first and second display areas, when a predetermined operation is made by the command input unit, the manipulating-function menu screen (a) moves the first display area with the plurality of first identification miniature images therein from the center of the display screen to one side of the display screen, (b) deletes the second display area with the plurality of second identification miniature images therein from the display screen, (c) displays a third display area which displays the first group of a plurality of manipulation-function items for individually manipulating each to-be-displayed objects, and (d) displays a fourth display area which displays the second group of a plurality of manipulation-function items for manipulating the entire plurality of to-be-replayed objects.

2. The device according to claim 1, wherein the display controller displays the first and second groups of manipulating-function items when a predetermined manipulation command is accepted via the command input unit while the plurality of identification miniature images for the respective to-be-replayed objects is being displayed on one display screen with a to-be-replayed object corresponding to an identification miniature image in a predetermined position being taken as a to-be-replayed object of interest.

3. The device according to claim 2, wherein, when the predetermined manipulation command is entered via the command input unit, the plurality of identification miniature images for the respective to-be-replayed objects is moved to a one-sided position on the display screen, and the first and second groups of manipulating-function items are displayed in a space resulted from the movement of the identification miniature images.

4. The device according to claim 3, wherein, when a first one of the groups of identification miniature images is moved to a one-sided position on the display screen, the identification miniature image of the to-be-replayed object of interest is displayed with an indication of the movement of the identification miniature images corresponding to the to-be-replayed object of interest.

5. The device according to claim 4, wherein the identification miniature image corresponding to the to-be-replayed object of interest is rotated with an indication of the movement of the identification miniature image.

6. The device according to claim 1, wherein while any one of the manipulating-function items included in at the least the first group is being selected, the identification miniature image corresponding to the to-be-replayed object of interest is displayed in a different manner from that in which the other identification miniature images are displayed, and while any one of the manipulating-function items included in the second group is being selected, the identification miniature image corresponding to the to-be-replayed object of interest is displayed in the same manner as that in which the other identification miniature images are displayed.

7. The device according to claim 1, wherein either of the first and second groups of manipulating-function items, whichever includes the manipulating-function item being selected, is displayed being emphasized for differentiation from the other group.

8. The device according to claim 1, wherein at least the first identification miniature images arrayed in the first direction is scrolled in the first direction by a predetermined operation made via the command input unit to allow the content in the to-be-replayed object of interest at the intersection to be changed.

9. The device according to claim 1, wherein when the first display area is moved to a one-sided position on the display screen, the first and second groups of manipulating-function items are displayed in a space resulted from the movement of the first display area.

10. The device according to claim 9, wherein when the first display area is moved to the one-side position on the display screen, the identification miniature image corresponding to the to-be-replayed object of interest is displayed with an indication of the movement of the first display area.

11. The device according to claim 10, wherein the identification miniature image corresponding to a content in the to-be-replayed object of interest is rotated to indicate the movement of the first display area.

12. A playback device comprising:
a command input unit to accept a command entered by a user;
a display controller to generate image data on a manipulating-function menu screen including a plurality of identification miniature images for respective ones of a plurality of to-be-replayed objects; and
a display output unit to output the manipulating-function menu screen image data from the display controller to a display unit,
the display controller functioning to:
selectively display, by a predetermined operated made via the command input unit,
(1) a first manipulating-function menu screen in which a plurality of identification miniature images for the respective plurality of to-be-replayed objects is displayed simultaneously on one display screen with a to-be-replayed objects corresponding to a identification miniature image in a predetermined position being taken as a to-be-replayed object of interest and also a first group of a plurality of manipulating-function items for each of the to-be-replayed objects is displayed so that one of the manipulating-function items can be selected by an operation made via the command input unit, and with an indication of which one of the manipulating-function items is being selected, and
(2) a second manipulating-function menu screen in which the plurality of identification miniature images for respective ones of the plurality of to-be-replayed objects is displayed simultaneously on one display screen with a to-be-replayed objects corresponding to the identification miniature image in a predetermined position being taken as a to-be-replayed object of interest and also a second group of a plurality of manipulating-function items for the plurality of to-be-replayed objects is displayed so that one of the manipulating-function items can be selected by an operation made the command input unit, and with an indication of which one of the manipulating-function items is being selected; and
(3) display, during selection any one of the manipulating-function items included in at least the first group, the identification miniature image corresponding to the to-be-replayed object of interest in such a manner that the identification miniature image can be differentiated from the other identification miniature images,
wherein a plurality of types of media can be replayed and a plurality of contents in each of the media can be replayed, and
wherein the identification miniature images corresponding to the to-be-replayed objects are taken as a first identification miniature image while the identification miniature images corresponding to each of the plurality of medium types are taken as a second identification miniature image;
the display controller functions to:
display a menu in which the plurality of first identification miniature images is arrayed in a first display area extending in a first direction on the display screen and the plurality of second identification miniature images is arrayed in a second display are extending in a second direction, the first and second display areas intersecting near a center of the display screen, and a content corresponding to the first identification miniature image in a position near the intersection being taken as a content in the to-be-replayed content of interest; and
display, in the menu screen showing the first and second display areas intersecting each other, when a predetermined command is entered via the command input unit either the first or second manipulating-function menu screen (a) moving the first display area with of the plurality of first identification miniature images from the center of the display screen to one side of the menu screen, (b) deleting the second display area with the plurality of second identification miniature images therein from the menu screen, (c) displays a third display area which displays the first group of a plurality of manipulation-function items for individually manipulating each to-be-displayed objects, and (d) displays a fourth display area which display the second group of a plurality of manipulation-function items for manipulating the entire plurality of to-be-replayed objects.

13. The device according to claim 12, wherein the plurality of identification miniature images for the respective to-be-replayed objects is moved at the same time in one direction on the display screen correspondingly to the selection between the first and second manipulating-function menu screens, and the first group of manipulating-function items is placed at one side in the moving direction with respect to the plurality of identification miniature images while the second group of manipulating-function items is placed at the other side in the moving direction with respect to the plurality of identification miniature images.

14. The device according to claim 12, wherein at least the first identification miniature images arrayed in the first direction is scrolled in the first direction by a predetermined operation made via the command input unit to allow the content in the to-be-replayed object of interest at the intersection to be changed.

15. The device according to claim 12, wherein in the display screen displaying the first and second identification miniature image arrays intersecting each other, when the first display area with the first identification miniature images is moved to a one-sided position on the display screen, the first or second group of manipulating-function items is displayed in a space resulted from the movement of the first display area.

16. The device according to claim 15, wherein when the first display area is moved to the one-side position on the display screen, the identification miniature image corresponding to the to-be-replayed object of interest is displayed with an indication of the movement of the first display area.

17. The device according to claim 16, wherein the identification miniature image is rotated to indicate the movement of the first display area.

18. A method of displaying a manipulation menu in a playback device, the method comprising the steps of:
displaying a menu including first and second display areas intersecting near a center of a display screen;
when a predetermined operation is made via a command input unit, deleting the first display area, and outputting, to a display device, image data on a manipulating-function menu screen in which (a) a plurality of identification miniature images for respective ones of a plurality of to-be-replayed objects is displayed simultaneously in the second display area on one display screen with the to-be-replayed object corresponding to the identification miniature image in a predetermined position of the second display area being taken as a to-be-replayed object of interest, and (b) a first group of a plurality of manipulating-function items, for individually manipulating each of the to-be-replayed objects, displayed in a third display area and (c) a second group of a plurality of manipulating-function items, for manipulating the entire plurality of to-be-replayed objects, displayed in a fourth display area; wherein the third and fourth display areas are displayed so that one of the manipulating-functions can be selected by an operation made via the command input unit, and with an indication of which one of the manipulating-function items being selected;
accepting a command for selection of one of the manipulating-function items, entered by a user;
displaying, when a select command accepted in the select command accepting step is for selection of any one of the manipulating-function items included in the first group, the selected manipulating-function item for differentiation from the other manipulating-function items as well as for differentiation between the identification miniature image corresponding to the to-be-replayed object of interest and other identification miniature images; and
displaying, when the select command accepted in the select command accepting step is for selection of any one of the manipulating-function items included in the second group, the selected manipulating-function item for differentiation from the other manipulating-function items and the identification miniature image corresponding to the to-be-replayed object of interest in the same manner as that in which the other identification miniature images are displayed.

19. A method of displaying a manipulation menu in a playback device, the method comprising the steps of:
displaying a menu including first and second display areas intersecting near a center of a display screen;
when a predetermined operation is made via a command input unit, deleting the first display area and displaying a plurality of identification miniature images for respective ones of to-be-replayed objects simultaneously in the second display area on one display screen with taking one of the to-be-replayed objects corresponding to one of the identification miniature images in a predetermined position of the second display area as a to-be-replayed object of interest;
accepting a first predetermined command entered by a user;
outputting, to a display unit, image data on a manipulating-function menu screen in which a first group of a plurality of manipulating-function items, for individually manipulating each of the to-be-replayed objects, and a second group of a plurality of manipulating-function items, for manipulating the entire plurality of to-be-replayed objects, are displayed in third and fourth display areas so that one of the manipulating-functions can be selected when the first command is accepted in the first command accepting step, and with a display of which one of the manipulating-function items being selected;
accepting a second command for selection of one of the manipulating-function items in the first or second group, entered by the user;
displaying, when the select command accepted in the second command accepting step is for selection of any one of the manipulating-function items included in the first group, the selected identification miniature image for differentiation from the other manipulating-function items as well as for differentiation between the identification miniature image corresponding to the to-be-replayed object of interest and other identification miniature images; and
displaying, when the select command accepted in the second command accepting step is for selection of any one of the manipulating-function items included in the second group, the selected identification miniature image for differentiation from the other manipulating-function items and the identification miniature image corresponding to the to-be-replayed object of interest in the same manner as that in which the other identification miniature images are displayed.

20. The method according to claim 19, wherein, when the predetermined manipulation command is entered via the command input unit, the second display area with plurality of identification miniature images for the respective to-be-replayed objects is moved from a center of the display screen to a one-sided position on the display screen, and the first and second groups of manipulating-function items are displayed in a space resulted from the movement of the second display area.

21. The method according to claim 20, wherein, when the second display area is moved from the center to the one-sided position on the display screen, the identification miniature image of the to-be-replayed object of interest is displayed with an indication of the movement of the identification miniature images corresponding to the to-be-replayed object of interest.

22. The method according to claim 21, wherein the identification miniature image corresponding to the to-be-replayed object of interest is rotated with an indication of the movement of the second display area.

23. The method according to claim 18, wherein either of the first and second groups of manipulating-function items, whichever includes the manipulating-function item being selected, is displayed being emphasized for differentiation from the other group.

24. The method according to claim 18, wherein:
a plurality of medium types can be replayed;
a plurality of contents in each of the media can be replayed; and
the to-be-replayed object is a content that can be replayed.

25. A method of displaying a manipulation menu in a playback device, comprising:
displaying a menu including a first display area in which a plurality of first identification miniature images corresponding to each of a plurality of types of media which can be replayed is laid in a line in a first direction on a display screen and a second display area in which a plurality of second identification miniature images corresponding to each of the contents which can be replayed is laid in a line in a second direction, the first and second display areas intersecting near a center of the display screen, with taking a content corresponding to one of the first identification miniature images positioned near the intersection as a to-be-replayed content of interest;
displaying, in the menu screen showing the first and second display areas intersecting each others, when a predetermined operation is made via the command input unit, a manipulating-function menu screen including the (a) the second display area only with deletion of the first display area and in which (b) a first group of a plurality of manipulating-function items, for individually manipulating each of the content, displayed in a third display area and (c) a second group of a plurality of manipulating-function items, for manipulating the entire plurality of to-be-replayed objects of interest, displayed in a fourth display area so that one of the plurality of manipulating-function items can be selected,
accepting a command entered by the user;
displaying, when the command entered in the command accepting step is for selection of any one of the manipulating-function items included in the first group, the selected manipulation-function item for differentiation from the other manipulating-function items and the second identification miniature image corresponding to the to-be-replayed object of interest for differentiation from the other second identification miniature images; and
displaying, when the command entered in the command accepted in the command accepting step is for selection of any one of the manipulating-function items included in the second group, the selected manipulating-function item for differentiation from the other manipulating-function items and the second identification miniature image corresponding to the to-to-replayed object of interest in the same manner as that in which the other second identification miniature images are displayed.

26. The method according to claim 25, wherein either of the first and second groups of manipulating-function items, whichever includes the manipulating-function item being selected, is displayed being emphasized for differentiation from the other group.

27. The method according to claim 25, wherein the content in the to-be-replayed object of interest at the intersection can be changed with at least the second identification miniature images arrayed in the second direction being scrolled in the second direction by making a predetermined operation of the command input unit.

28. The method according to claim 25, wherein when a predetermined operation is made via the command input unit while the first and second display areas intersecting each other are being displayed on the display screen, the second display area with the second identification miniature images is moved to a one-sided position on the display screen and the first and second groups of manipulating-function items are displayed in a space resulted from the movement of the second display area.

29. The method according to claim 28, wherein when the second display area is moved to a one-side position on the display screen, the second identification miniature image corresponding to the content in the to-be-replayed object of interest is displayed with an indication of the movement of the second display area.

30. The method according to claim 29, wherein the second identification miniature image corresponding to the content in the to-be-replayed object of interest is rotated to indicate the movement of the second display area.

31. A method of displaying a manipulation menu in a display device, comprising the steps of:
displaying a first manipulating-function menu screen in which a plurality of identification miniature images for the respective to-be-replayed objects is displayed simultaneously in an initial display area on one display screen with taking one of the to-be-replayed objects corresponding to one of the identification miniature images in a predetermined position of the initial display area as a to-be-replayed object of interest and also a first group of a plurality of manipulating-function items for each of the to-be-replayed objects is displayed in a first manipulating function display area so that one of the manipulating-function items can be selected; and
switching, when a first predetermined command entered by the user is accepted while the first manipulating-function menu screen is being displayed, the first manipulating-function menu screen to a second manipulating-function menu screen in which the plurality of identification miniature images for the plurality of to-be-replayed objects is displayed simultaneously in a second manipulation function display area on one display screen with taking one of the to-be-replayed objects corresponding to one of the identification miniature images in the predetermined position as a to-be-replayed object of interest and also a second group of a plurality of manipulating-function items for the respective to-be-replayed objects is displayed so that one of the manipulating-function items to can be selected;
switching the second manipulating-function menu screen being displayed to the first manipulating-function menu screen when a predetermined second command entered by the user is accepted while the second manipulating-function menu screen is being displayed; and
displaying the identification miniature image corresponding to the to-be-replayed object of interest in at least the first manipulating-function menu screen for differentiation from the other identification miniature images,
wherein a plurality of medium types can be replayed, a plurality of contents in each of the media can be replayed, and the to-be-replayed object is a content that can be replayed;
there are included the steps of:
displaying a menu including a first display area in which a plurality of first identification miniature images corresponding to each of a plurality of types of media which can be replayed is laid in a line in a first direction on a display screen and a second display area in which a plurality of second identification miniature images corresponding to each of the contents which can be replayed is laid in a line in a second direction, the first and second display areas intersecting near a center of the display screen, with taking a content corresponding to one of the first identification miniature images positioned near the intersection as a to-be-replayed content of interest; and displaying, in the menu screen showing the first and second display areas intersecting each other when a predetermined third command is entered, the first or second manipulating-function menu screen (a) moving the second display area with the plurality of second identification miniature images from near the center of the menu screen to one side of the menu screen, (b) deleting the first display area with the plurality of first identification miniature images from the menu screen, (c) displays a third display area which displays the first group of a plurality of manipulation-function items for individually manipulating each to-be-displayed objects, and (d) displays a fourth display area which displays the second group of a plurality of manipulation-function items for manipulating the entire plurality of to-be-replayed objects.

32. The method according to claim 31, wherein when a third predetermined command entered by the user is accepted while a plurality of identification miniature images for the respective to-be-replayed objects is being displayed simultaneously on one screen with taking the to-be-replayed object corresponding to the identification miniature image in a predetermined position as a to-be-replayed object of interest, the first or second manipulating-function menu screen is displayed.

33. The method according to claim 32, wherein when the third predetermined command entered by the user is accepted while a plurality of identification miniature images for the respective to-be-replayed objects is being displayed simultaneously on one screen with taking the to-be-replayed object corresponding to the identification miniature image in a predetermined position as a to-be-replayed object of interest, the initial display area is moved to a one-sided position on the display screen and the first and second groups of manipulating-function items are displayed in a space resulted from the movement of the initial display area.

34. The method according to claim 31, wherein, when the predetermined third command is entered, the second display area within the plurality of second identification miniature images is moved to a one-sided position on the display screen, and the first or second group of manipulating-function items is displayed in a space resulted from the movement of the second display area.

35. The method according to claim 33, wherein, when the first group of identification miniature images is moved to the one-sided position on the display screen, the identification miniature image of the to-be-replayed object of interest is displayed with an indication of the movement.

36. The method according to claim 34, wherein when the second display area is moved to a one-sided position on the display screen, the identification miniature image corresponding to the to-be-replayed object of interest is displayed with an indication of the movement.

37. The method according to claim 35, wherein the identification miniature image corresponding to the to-be-replayed object of interest is rotated with an indication of the movement.

38. The method according to claim 31, wherein the plurality of identification miniature images corresponding to each of the respective to-be-replayed objects is moved at the same time in one direction on the display screen correspondingly to the selection between the first and second manipulating-function menu screens, and the first display area with first group of manipulating-function items is placed at one side in the moving direction with respect to the plurality of identification miniature images while the second display area with second group of manipulating-function items is placed at the other side in the moving direction with respect to the plurality of identification miniature images.

* * * * *